United States Patent
Graham et al.

(10) Patent No.: US 10,124,358 B1
(45) Date of Patent: Nov. 13, 2018

(54) AUTOMATED ADAPTIVE SPRINKLER SYSTEM

(71) Applicant: Aquatic Robotics, Inc., Bellevue, WA (US)

(72) Inventors: Oliver T. Graham, Bellevue, WA (US); Kenneth Whiting, Kirkland, WA (US)

(73) Assignee: Aquatic Robotics, Inc., Bellevue, WA (US)

( * ) Notice: Subject to any disclaimer, the term of this patent is extended or adjusted under 35 U.S.C. 154(b) by 0 days.

(21) Appl. No.: 15/829,685

(22) Filed: Dec. 1, 2017

Related U.S. Application Data

(60) Provisional application No. 62/443,898, filed on Jan. 9, 2017.

(51) Int. Cl.
| | | |
|---|---|---|
| *B05B 12/02* | (2006.01) | |
| *B05B 12/12* | (2006.01) | |
| *G05B 19/042* | (2006.01) | |
| *B05B 15/652* | (2018.01) | |

(52) U.S. Cl.
CPC .............. *B05B 12/02* (2013.01); *B05B 12/12* (2013.01); *B05B 15/652* (2018.02); *G05B 19/042* (2013.01); *G05B 2219/2625* (2013.01)

(58) Field of Classification Search
CPC ....... B05B 12/02; B05B 12/12; B05B 15/066; B05B 15/652; G05B 19/042; G05B 2219/2625
USPC ...... 239/1, 200–210, 214.23, 227, 232, 237, 239/243, 256, 262, 263.1
See application file for complete search history.

(56) References Cited

U.S. PATENT DOCUMENTS

| | | | | |
|---|---|---|---|---|
| 5,740,038 A | * | 4/1998 | Hergert | A01G 25/092 700/284 |
| 7,203,576 B1 | * | 4/2007 | Wilson | A01G 25/165 137/78.3 |
| 7,805,221 B2 | * | 9/2010 | Nickerson | A01G 25/16 239/69 |
| 8,538,592 B2 | * | 9/2013 | Alexanian | A01G 25/16 239/69 |
| 8,793,024 B1 | * | 7/2014 | Woytowitz | A01G 25/167 137/78.2 |

(Continued)

*Primary Examiner* — Alexander Valvis
*Assistant Examiner* — Juan C Barrera
(74) *Attorney, Agent, or Firm* — FSP LLC

(57) ABSTRACT

A system for allocating irrigation resources includes a hub for collecting imaging data and soil condition readings from watering areas proximal to sprinkler nodes. A combiner operated to form combined cluster data from each sprinkler node in a sprinkler cluster. An interpreter operated to generate mapped cluster data from combined cluster data and a geolocation map. A correlator to generate a current cluster snapshot from the mapped cluster data and spatiotemporal weather information. A comparator configured to compare the current cluster snapshot with recorded sprinkler cluster activity data to determine deficient regions within the watering areas in sprinkler cluster, and generate an activation control for the sprinkler cluster. A selector to select a spatiotemporal watering control from the activation control for a specific sprinkler node. The specific sprinkler node to deliver a directed fluid stream to the deficient region within the watering area.

11 Claims, 15 Drawing Sheets

(56) References Cited

U.S. PATENT DOCUMENTS

| | | | |
|---|---|---|---|
| 8,930,032 B2* | 1/2015 | Shupe | A01G 25/16 239/11 |
| 2011/0224836 A1* | 9/2011 | Hern | A01G 25/167 700/284 |

* cited by examiner

AUTOMATED ADAPTIVE SPRINKLER SYSTEM

CROSS-REFERENCE TO RELATED APPLICATIONS

This application claims benefit under 35 U.S.C. 119 to U.S. application Ser. No. 62/443,898, entitled "AUTOMATED ADAPTIVE SPRINKLER SYSTEM", filed on Jan. 9, 2017, and incorporated herein by reference in its entirety.

BACKGROUND

Referencing FIG. 1, a conventional sprinkler system 100 comprises a sprinkler 102, a sprinkler 104, a sand trap 106, an over watered area 108, an under watered area 110, a water spray pattern 112, a water spray pattern 114, and a remote controller 116. Conventional sprinkler design is limited to fixed patterns and cannot vary speeds. Large commercial sprinklers can cover large areas and are not able to vary the amount of water to locations within the pattern based on differing soil conditions and areas that do not require water.

The maintenance and health of desired flora on residential and commercial properties utilize water delivery systems. Many of these systems have their roots in irrigation systems utilized for agricultural purposes and, as such, suffer from several shortcomings. The shortcomings may be attributable to the variety in terrain and topography that may inhibit uniform water delivery across a property. One notable example is golf courses. Golf courses are inefficiently watered with the existing industry standard watering systems. The industry standard watering systems have not changed in decades. Although attempts have been made to modernize these systems through the implementation of simplified control systems, such as sprinkler zone controls, these systems fail to address the problem of controlling individual sprinkler heads to deliver the water where it is needed. As such, these systems fail to provide a significant improvement over existing systems resulting in water deficient regions, brown grass and under-watered plants, or excessive water use.

On some golf courses, compromises are mitigated by hand watering, which may be inconsistent and labor intensive. Similarly, the problem extends to smaller yards and may require multiple consultations with professional installers to optimize water delivery, yet with minimal improvement. The primary limitation of existing sprinkler systems is the lack of control over individual heads without physical adjustment, where the amount of water does not vary within the radius covered by the sprinkler head. These heads do not handle irregularly shaped areas where some watering areas within the radius do not require watering.

BRIEF SUMMARY

An automated adaptive sprinkler system may be comprise a sprinkler head that is capable of delivering varying amounts of water precisely to any location within a range of operation. This may be accomplished through the use of adjustable servos capable of adjusting orientation, elevation, flow rate and volume to deliver water to a precise location. The automated adaptive sprinkler system may include a switch between nozzles to optimize water dispersion patterns.

The automated adaptive sprinkler system may be operated by a control system to manage adjustment of sprinkler head orientation for elevation, rate of travel, and water flow to cover desired areas reachable by the sprinkler. The control system may include controls for adjusting watering times, areas, and amount of water determined by environmental and based on inputs from multiple sources. These sources may include, but are not limited to, user programming, image analysis, moisture sensors, soil analysis, topographical information and weather information from local sensors or external sources. The system may incorporate the inputs to determine the minimum water usage to maintain the desired vegetation quality.

The automated adaptive sprinkler system may incorporate the inputs to perform analysis on the soil types to correct soil condition based on soil analysis inputs. The adaptive sprinkler heads may collect inputs through a ground sensor and/or through an imaging sensor to assist in the identification of plants and recommendations for water and nutrient requirements for the soil. The system may use the information to generate recommendations for improving the soil condition and/or suggest delivery of specific nutrients to the soil.

The automated adaptive sprinkler heads may incorporate a nutrient or chemical delivery system to administer chemicals to condition the soil and improve vegetation growth. The adaptive sprinkler heads may accomplish nutrient delivery by receiving a nutrient formulation directly at the sprinkler head or by receiving the formulation through the same fluid channel it receives pressurized water. The delivery system may also deliver detrimental chemical to targeted location, such as insecticides or iron-based solutions to eliminate mosses.

The automated adaptive sprinkler system may incorporate an imaging system on the sprinkler heads utilized with topographical maps and satellite imaging to generate a high-resolution map to direct fluid flow to specific locations. The high-resolution map may be utilized in order to establish a grid or localized coordinate system to direct water flow from each individual sprinkler head. The topographical maps and imaging data may be utilized to determine and identify objects or features (e.g., trees, taller vegetation, structures, etc.) that may interfere with delivery and absorption by the intended vegetation. Topographical maps may be utilized with the grid system to and the imaging data from the sprinkler heads to determine improvements for water delivery based on flow path.

The imaging system may include an infrared imaging component utilized to determine the ground temperature when during the heating and cooling of water to determine soil moisture by taking advantage of water's high specific heat. The imaging system may incorporate features to adjust the resolution of the grid or coordinate system to aim and deliver fluid to specific regions. The imaging system may utilize imaging resources (e.g., imaging sensors, image processing, image analysis, etc.) to determine the effectiveness of the water delivery and to determine adjustments or corrections based on localized obstructions and/or weather conditions.

The automated adaptive sprinkler system may incorporate a learning system to run "experiments" designed to test reduced water output to grid points within a head's range, monitor results and adjust the program dynamically.

The automated adaptive sprinkler system may incorporate user experience (UX) feature in a graphical user interface (UI) to facilitate the configuration and management of the automated adaptive sprinkler system. The UI may incorporate features utilized for head configuration. The UI may be accessible through a mobile device to control manual steering of the head. The manual alignment may be incorporated to direct water flow to points on straight lines, multiple points on a curve and subsequent location of key plants like trees. The UI may be utilized to create a map where topography maps are not available.

The automated adaptive sprinkler system may communicate with a network or cloud service to collect weather data. The weather data may be utilized by the adaptive sprinkler system to coordinate and communication between heads, and control of heads based on the current weather conditions.

The automated adaptive sprinkler system may incorporate a deployable optical sensor drone utilized to take imaging data and other sensor readings. The deployable aerial drone may be stored within a sprinkler head. Alternatively, the deployable aerial drone may be accomplished by an autonomous commercial drone to monitor results and take readings. The system may augment the initial imagery from an existing topographical map with the drone topography imaging in order to improve resolution of the sprinkler area.

The automated adaptive sprinkler system may incorporate screens to redirect laminar flow. The automated adaptive sprinkler system may incorporate multiple, switchable sprinkler heads for water delivery. Additionally, the sprinkler heads may be utilized to track and spray undesirable animals or pests.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
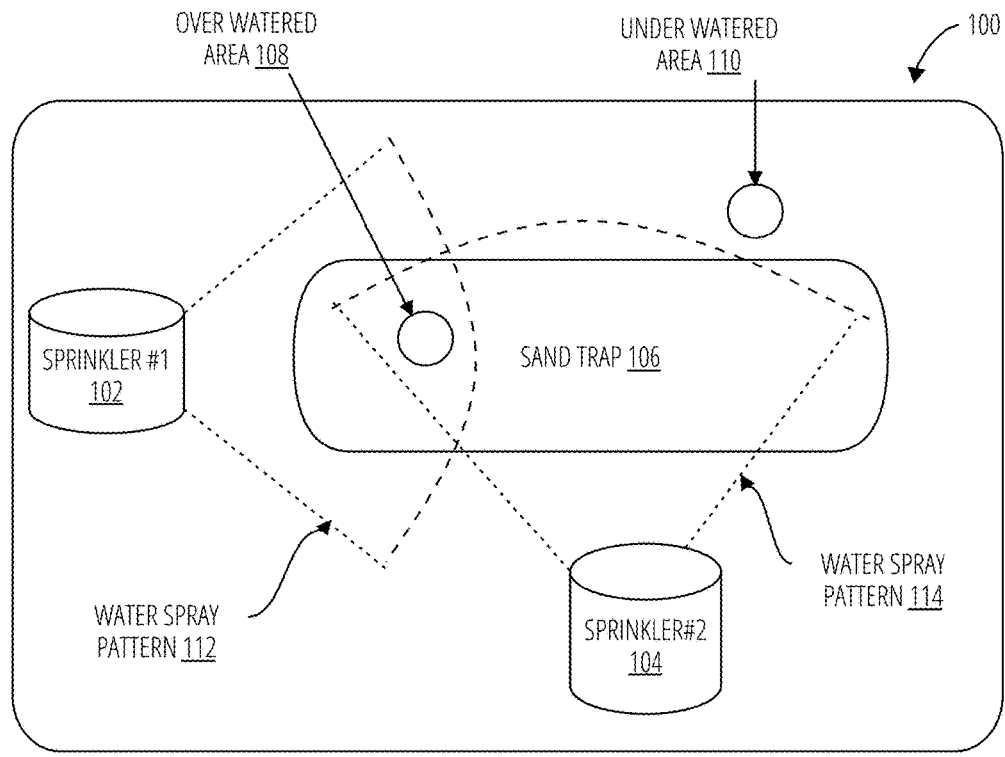
FIG. 1 illustrates a conventional sprinkler system 100.
Figure 1:
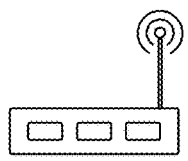

A process for operating a system for allocating irrigation resources may include operation of image sensors and ground sensors, of sprinkler node to collect imaging data and soil condition readings, for a watering area proximal to the sprinkler node. The system may incorporate a combiner operated to combine sprinkler node sensor readings, comprising the imaging data and the soil condition readings, from each sprinkler node in a sprinkler cluster, to form combined cluster data. The system for allocating irrigation resources may include an interpreter operated to generate mapped cluster data through mapping of the combined cluster data to a geolocation map. A correlator may be included to correlate the mapped cluster data and spatiotemporal weather information to generate a current cluster snapshot. A comparator may be configured with pre-configured watering parameters stored from memory to compare the current cluster snapshot with recorded sprinkler cluster activity data stored in a control memory data structure determine deficient regions within the watering areas in sprinkler cluster and generate an activation control for the sprinkler cluster. A selector may be included to select a spatiotemporal watering control for a specific sprinkler node from the activation control. The specific sprinkler node may be operated to deliver a directed fluid stream to the deficient region within the watering area as controlled by the spatiotemporal watering control.

The recorded sprinkler cluster activity data may include cluster snapshots, each comprising sprinkler node sensor readings and recorded spatiotemporal weather information, and the corresponding activation controls sent to the sprinkler cluster. The spatiotemporal watering control may include controls for the activation time, flow pattern, and water volume for the directed fluid stream, and calibration settings for the specific sprinkler node.

In the system for allocating irrigation resources, each sprinkler node may communicate directly with a hub to send the sprinkler node sensor reading and receive the activation controls. The sprinkler nodes of the sprinkler cluster may operate as part of a mesh network communicating with the hub to send the sprinkler node sensor readings and receive the activation controls.

The system for allocating irrigation resources may process the received information in layers to generate a mapped grid of the node cluster area. The mapped grid may be utilized to determine slopes as part of a topographical map to determine soil moisture content. The ground sensor may be accomplished by a localized probe to determine humidity, change in humidity based on water, specific heat provided by the watering system, soil nutrients, and soil condition. The system for allocating irrigation resources may utilize local weather information to determine when to water based on weather conditions (e.g., wind, temperature, sun light, etc.) and precipitation settings.

The image sensor may be utilized as part of an optical imaging system to detect deficient regions within the grid that are in reach of specific sprinklers. The imaging system may be utilized to detect moisture utilizing the black body heat generated by the heat of evaporation of morning dew. The imaging system may utilize color detection to determine deficient regions due to browning or yellowing of chlorophyll. The imaging system may be utilized in combination with a topographical map to determine slopes and inspect depressions where rain water and delivered water may collect.

The sprinkler head may be powered by a hard-lined power source. Alternatively, the sprinkler head may incorporate a turbine in the fluid channel to charge a battery as secondary or primary power source. The sprinkler head may incorporate screen to reduce laminar flow in water stream from the nozzle. The sprinkler head may incorporate a 3-axis system to direct the nozzle and water flow to deficient regions for water delivery.

The sprinkler may incorporate flow chambers and flow disrupting features (e.g., valves, venturi, angled fluid conduits, etc.,) to adjust the flow pressure adjust the distance for precise water delivery. The nozzle may be configured to adjust spray pattern in addition to the pressure adjustment in order to deliver water at the desired quantity to a particular region of the golf course. A sprinkler system may be utilized in combination with an active deterrent and mitigation system to identify pests, target and release a single stream of water to encourage the pest to leave the location.

The mapping system may be self-calibrating for determining a location to deliver water. The mapping system may utilize the detected ambient conditions and the at least one sensor reading from a nearby sprinkler system as a verification of water delivery. The system may include a sprinkler head and control system. The sprinkler head and control system may include servo motors, an adjustable nozzle, a fluid channel to receive waters from a main, and a communication device to send status information and at least one sensor readings to a hub.

The controller for the sprinkler system may be operated to control the nozzle to adjust flow pattern, a pressure control system to adjust water pressure and delivery distance, a communications system may to deliver status information and at least one sensor readings to the hub and receive activation controls, an axial adjustment system to control direction of water delivery, and a power system to control activation and core operation of the sprinkler head.

Referring to FIG. 1, a conventional sprinkler system 100 comprises a sprinkler 102, a sprinkler 104, a sand trap 106, an over watered area 108, an under watered area 110, a water spray pattern 112, a water spray pattern 114, and a remote controller 116. Current sprinkler design is limited to fixed patterns and cannot vary speeds. Large commercial sprinklers can cover large areas and are not able to vary the amount of water to locations within the pattern based on differing soil conditions and areas that do not require water.

Figure 2:
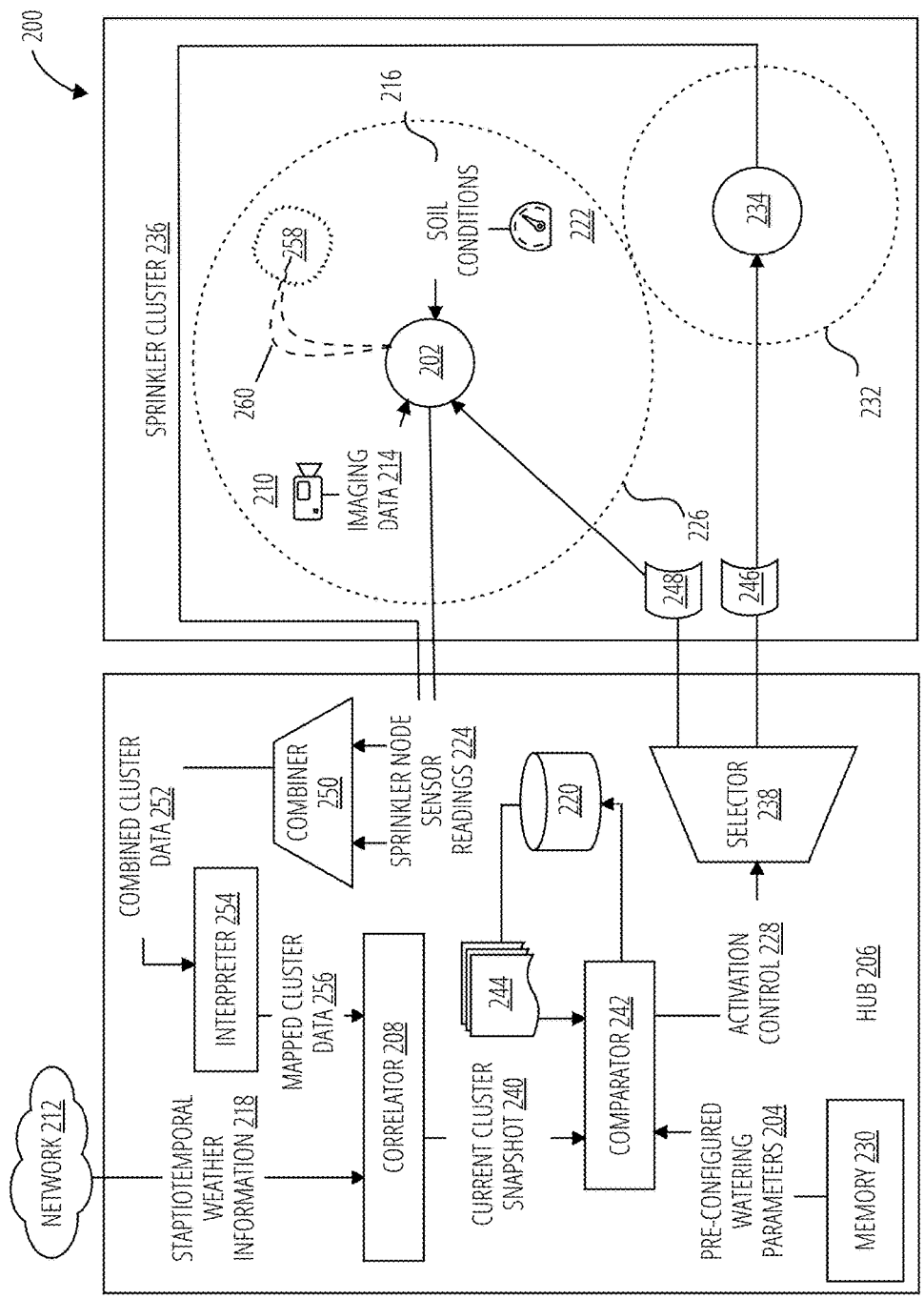
FIG. 2 illustrates an embodiment of a system for allocating irrigation resources 200.

Referring to FIG. 2, a system for allocating irrigation resources 200 comprises a hub 206, a network 212, a staptiotemporal weather information 218, a sprinkler node sensor readings 224, a sprinkler cluster 236, a node specific spatiotemporal watering control 246, and a node specific spatiotemporal watering control 248. The hub 206 further comprises pre-configured watering parameters 204, a correlator 208, a control memory data structure 220, an activation control 228, a memory 230, a selector 238, a current cluster snapshot 240, a comparator 242, recorded sprinkler cluster activity data 244, a combiner 250, combined cluster data 252, an interpreter 254, and mapped cluster data 256. The sprinkler cluster 236 further comprises the sprinkler node 202, the image sensor 210, the imaging data 214, the soil condition readings 216, the ground sensors 222, the watering area 226, the watering area 232, the other sprinkler node 234, the deficient region 258, and the directed fluid stream 260.

The sprinkler node 202 receives the imaging data 214 from the image sensor 210 and the soil condition readings 216 from the ground sensors 222. The sprinkler node 202 sends the sprinkler node sensor readings 224 to the combiner 250. The sprinkler node sensor readings 224 may include the imaging data 214 and the ground sensors 222, as well as other sensor readings (e.g., measure of local precipitation). The sprinkler node 202 receives the node specific spatiotemporal watering control 248 from the selector 238. The sprinkler node 202 sends the directed fluid stream 260 to the deficient region 258. The sprinkler node 202 may comprise a sprinkler head and a controller to perform the operations including altering a fluid stream into the directed fluid stream 260. The sprinkler node 202 may enrich the directed fluid stream into a directed soil enrichment stream.

The hub 206 receives the sprinkler node sensor readings 224 from the sprinkler node 202 and the other sprinkler node 234. The hub 206 receives the staptiotemporal weather information 218 from the network 212. The hub 206 then generates the node specific spatiotemporal watering control 246 and the node specific spatiotemporal watering control 248. The hub 206 sends the node specific spatiotemporal watering control 248 to the sprinkler node 202 and sends the node specific spatiotemporal watering control 246 to the other sprinkler node 234.

The correlator 208 receives the staptiotemporal weather information 218 from the network 212 and the mapped cluster data 256 from the interpreter 254. The correlator 208 generates a current cluster snapshot 240 from the staptiotemporal weather information 218 and the mapped cluster data 256. The correlator 208 send the current cluster snapshot 240 to the comparator 242.

The image sensor 210 receives visible light, infrared, or other image based information for the watering area 226. In other embodiments the image sensor 210 may receive image data for more than one watering area associated with a sprinkler cluster. The image sensor 210 sends the imaging data 214 to the sprinkler node 202. The image sensor 210 may sends imaging data 214 to another sprinkler node associated with a watering area, such as the other sprinkler node 234 and the watering area 232.

The network 212 sends the staptiotemporal weather information 218 to the correlator 208. The staptiotemporal weather information 218 may include expected precipitation probability and amount, a measure of the amount of sunlight to be received, wind, and temperature at a location associated with the sprinkler cluster 236 for a specific time period. The time period may be determined based on a previous activation control 228. The network 212 may be a telecommunications network which allows nodes to share resources. In computer networks, networked computing devices exchange data with each other using a data link. The connections between nodes are established using either cable media or wireless media.

The control memory data structure 220 stores the recorded sprinkler cluster activity data 244 and sends the recorded sprinkler cluster activity data 244 to the comparator 242. The control memory data structure 220 may receive the current cluster snapshot 240, comprising the sprinkler node sensor readings 224 and the staptiotemporal weather information 218, and the corresponding activation control 228 generated to update the recorded sprinkler cluster activity data 244. The recorded sprinkler cluster activity data 244 comprises node snap shots, each of the node snap shots comprising one or more of sprinkler node sensor readings, recorded spatiotemporal weather information, and the activation control sent to the sprinkler node (or the selector 238). The recorded sprinkler cluster activity data 244 may be stored for each segment of a geolocation map associated with the watering areas, such as specific grid locations of the geolocation map.

The ground sensors 222 detect the soil condition readings 216 and send the soil condition readings 216 to the sprinkler node 202. The soil condition readings 216 may include humidity, change in humidity based on water, specific heat provided by the watering system, soil nutrients, and soil condition.

The watering area 226 is a geographic location associated with the sprinkler node 202. The watering area 226 may be determined by the image sensor 210 of the sprinkler node 202. The watering area 226 may also be determined by operating the sprinkler node 202 to supply the directed fluid stream 260. The watering area 226 may also be determined by the operation of a location determining device to determine a set of location coordinates corresponding to the watering area 226. The watering area 226 may be regular or irregular in shape.

The memory 230 stores the pre-configured watering parameters 204. The pre-configured watering parameters 204 comprises logic instructions for the comparator 242 to generate the activation control 228 from the current cluster snapshot 240 and the recorded sprinkler cluster activity data 244. The pre-configured watering parameters 204 may be stored in the memory 230. The pre-configured watering parameters 204 may be altered and may differ based on the sprinkler cluster, location, time of day, time of year, etc.

The watering area 232 is a geographic location associated with the other sprinkler node 234. The watering area 232 may be determined by the sensors associated with the other sprinkler node 234. The watering area 232 may also be determined by operating the other sprinkler node 234 to supply a directed fluid stream. The watering area 232 may also be determined by the operation of a location determining device to determine a set of location coordinates corresponding to the watering area 232. The watering area 232 may be regular or irregular in shape.

The other sprinkler node 234 sends the sprinkler node sensor readings 224 to the combiner 250. The other sprinkler node 234 may receive sensor data from one or more sensors associated with the other sprinkler node 234. The sprinkler node sensor readings 224 may include imaging data, soil conditions, local precipitation, etc. The other sprinkler node 234 receives the node specific spatiotemporal watering control 246 from the selector 238. The other sprinkler node 234 may send a directed fluid stream to a deficient region. The other sprinkler node 234 may comprise a sprinkler head and a controller to perform the operations including altering a fluid stream into the directed fluid stream. The other sprinkler node 234 may enrich the directed fluid stream into a directed soil enrichment stream.

The sprinkler cluster 236 sends the sprinkler node sensor readings 224 to the hub 206. The sprinkler cluster 236 then receives the node specific spatiotemporal watering control 246 and the node specific spatiotemporal watering control 248 from the hub 206.

The selector 238 receives the activation control 228 from the comparator 242. The selector 238 then selects a spatiotemporal watering control for a specific sprinkler node from the activation control 228, such as the node specific spatiotemporal watering control 248 and the node specific spatiotemporal watering control 246 for the sprinkler node 202 and the other sprinkler node 234, respectively. The selector 238 then sends the node specific spatiotemporal watering control 248 to the sprinkler node 202 and sends the node specific spatiotemporal watering control 246 to the other sprinkler node 234. The node specific spatiotemporal watering control 246 and the node specific spatiotemporal watering control 248 comprising instructions to operate the other sprinkler node 234 and the sprinkler node 202, respectively.

The comparator 242 receives the current cluster snapshot 240 from the correlator 208, the recorded sprinkler cluster activity data 244 from the control memory data structure 220, and the pre-configured watering parameters 204 from the memory 230. The comparator 242 may utilize the pre-configured watering parameters 204 as logic to compare the current cluster snapshot 240 to the recorded sprinkler cluster activity data 244 to generate the activation control 228. The activation control 228 is then sent to the selector 238. The activation control 228 may comprise instruction to operate one, both, or neither of the sprinkler node 202 and the other sprinkler node 234. The activation control 228 may also comprise instructions to operate specific patterns of the directed fluid stream 260. The comparator 242 may also send the staptiotemporal weather information 218, the current cluster snapshot 240, and the generated activation control 228 to the control memory data structure 220 to update the recorded sprinkler cluster activity data 244.

The combiner 250 receives the sprinkler node sensor readings 224 from the sprinkler node 202 and the other sprinkler node 234. The combiner 250 generates the combined cluster data 252 from the sprinkler node sensor readings 224 and sends the combined cluster data 252 to the interpreter 254. The combiner 250 may receive further sprinkler node sensor readings from other sprinkler nodes and combine those sprinkler node sensor readings into the combined cluster data 252.

The interpreter 254 receives the combined cluster data 252. The interpreter 254 generates the mapped cluster data 256 and sends the mapped cluster data 256 to the correlator 208. The interpreter 254 may generate the mapped cluster data 256 by mapping the combined cluster data 252 to a geolocation map. The geolocation map may be a topographical map, a satellite-imaged map, or a virtual map generated utilizing a location determining device, and may include a grid system to help define deficient regions and operations to send the directed fluid stream or the directed soil enrichment stream to those deficient regions. The grid system may be irregularly shaped and may include a set of regular or irregular shapes, which may overlap.

The deficient region 258 is a region of the watering area 226 determined by the comparator 242 to receive a directed fluid stream 260 by the operation of the sprinkler node 202 in response to receiving the node specific spatiotemporal watering control 248. The deficient region 258 may lack moisture as determined by visual imaging (e.g., browning), infrared (e.g., high heat signature), or soil condition readings 216 (e.g., low humidity), may require additional nutrients (e.g., iron supplements for mosses based on imaging data 214 of moss based on shape, texture, color, etc.), or may be a pest based on imaging data 214 (e.g., shape and size), infrared signature (e.g., heat signature), etc.

The directed fluid stream 260 may be a fluid stream altered by the sprinkler node 202 through the operation of a sprinkler head and controller.

In some embodiments, the system for allocating irrigation resources 200 may further comprise a recommendation notification engine. The recommendation notification engine may comprise logic operators to determine whether specific deficient regions remain in a watering area after a one or more activation controls are utilized to send a directed fluid stream to that specific deficient region. The recommendation notification engine may utilize the recorded sprinkler cluster activity data 244 as well as threshold values stored in a memory, such as the memory 230, to determine whether to generate a recommendation notification. The recommendation notification may alter a machine display. Exemplary specific deficient regions include sand-fill areas that do not hold water or areas that accumulate water. The recommendation notification may direct specific action, such as replacing the area, modifying the watering area to not include the specific deficient region, adding soil enrichment devices to the sprinkler node to enable a directed soil enrichment stream, etc.

The system for allocating irrigation resources 200 may be operated in accordance with the process described in FIG. 3, FIG. 4, FIG. 6, FIG. 5, FIG. 7, FIG. 8, FIG. 11, and FIG. 12.

Figure 3:
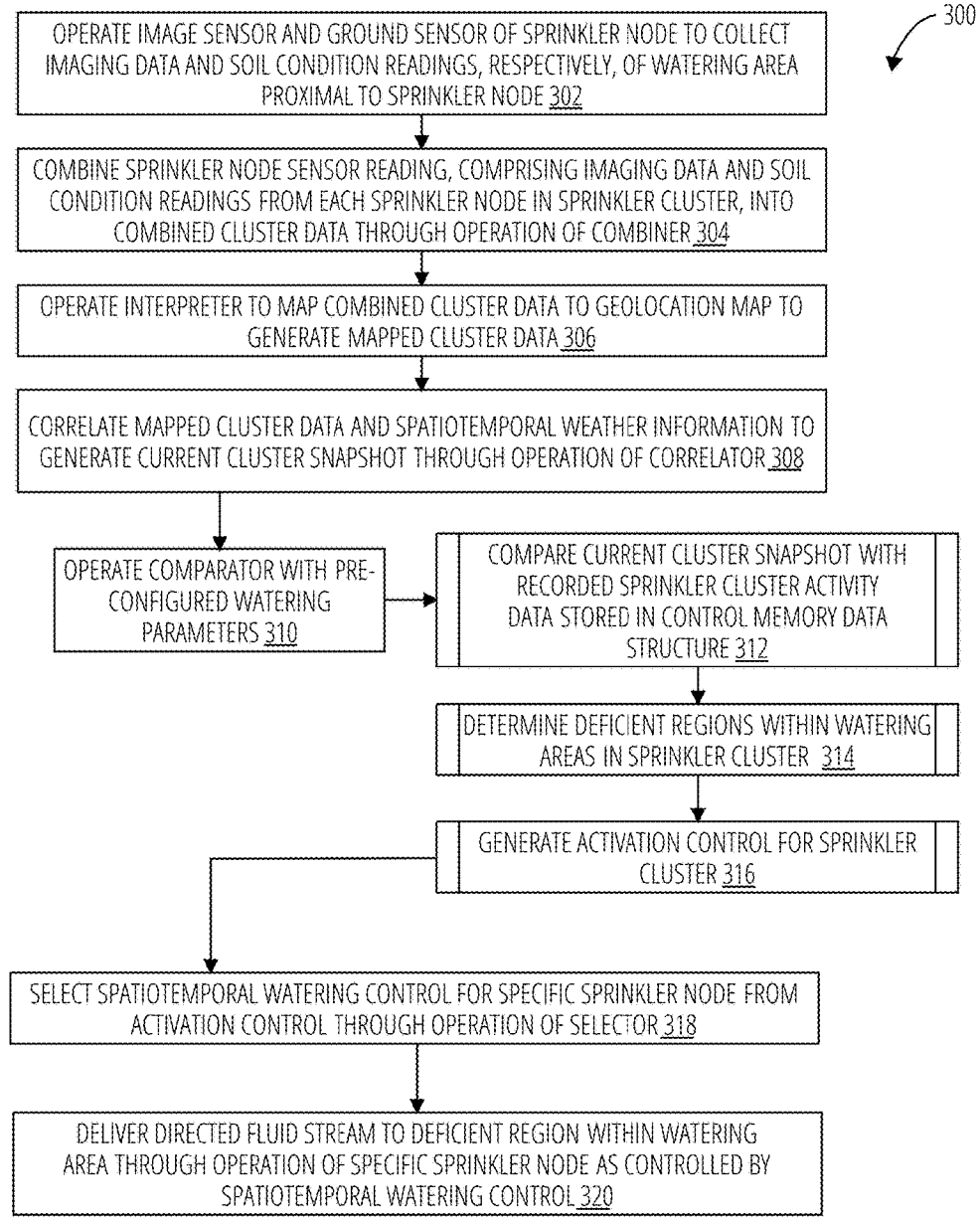
FIG. 3 illustrates an embodiment of a process for operating a system for allocating irrigation resources 300.

Referring to FIG. 3, a process for operating a system for allocating irrigation resources 300 operates image sensor and ground sensor of sprinkler node to collect imaging data and soil condition readings, respectively, of watering area proximal to sprinkler node (block 302). A combiner is operated to combine sprinkler node sensor reading, comprising imaging data and soil condition readings from each sprinkler node in sprinkler cluster, into a combined cluster data (block 304). An interpreter is operated to generate mapped cluster data through mapping the combined cluster data to a geolocation map (block 306). A correlator is operated to generate a current cluster snapshot through correlating the mapped cluster data and spatiotemporal weather information (block 308). A comparator is configured with pre-configured watering parameters stored in memory (block 310). The comparator compares the current cluster snapshot with recorded sprinkler cluster activity data stored in a control memory data structure (subroutine block 312). The comparator determines deficient regions within the watering areas in sprinkler cluster (subroutine block 314). The comparator generates an activation control for the sprinkler cluster (subroutine block 316). A selector selects spatiotemporal watering control for a specific sprinkler node from the activation control (block 318). The specific sprinkler node delivers a directed fluid stream to the deficient region within the watering area as controlled by the spatiotemporal watering control (block 320).

Figure 4:
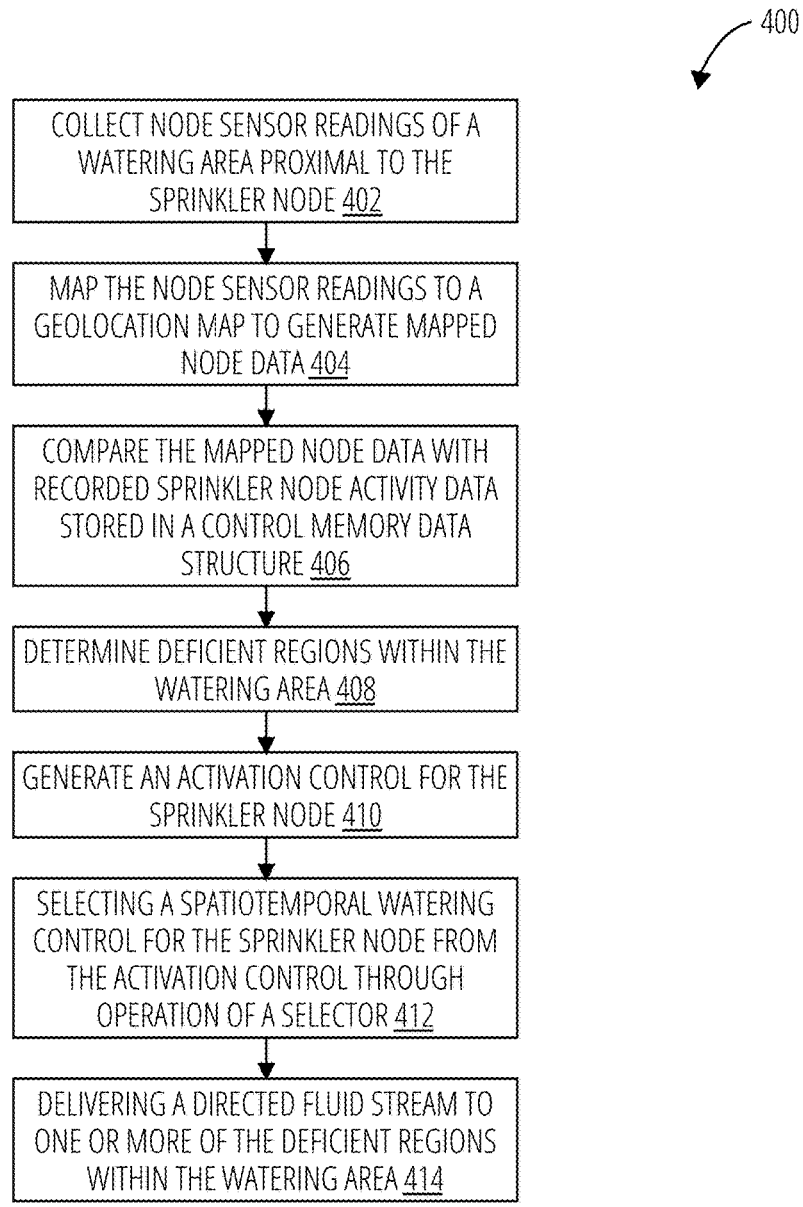
FIG. 4 illustrates an embodiment of an irrigation resources allocation method 400.

Referring to FIG. 4, an irrigation resources allocation method 400 collects node sensor readings of a watering area proximal to the sprinkler node (block 402). The node sensor readings may be collected by operating at least one sensor of a sprinkler node. Multiple sprinkler nodes may be operated to collect the node sensor readings, which may then be combined. A neural network may be utilized to perform image recognition. The node sensor readings are then mapped to a geolocation map to generate mapped node data (block 404). The mapping may be performed by an interpreter. The mapped node data is compared with recorded sprinkler node activity data stored in a control memory data structure (block 406). A comparator with pre-configured watering parameters may be utilized to compare the mapped node data to the recorded sprinkler node activity data. The deficient regions are determined within the watering area (block 408). The comparator with pre-configured watering parameters may be utilized to determine the deficient regions. An activation control is generated for the sprinkler node (block 410). The comparator with pre-configured watering parameters may be utilized to generate the activation control. A spatiotemporal watering control is then selected for the sprinkler node from the activation control through operation of a selector (block 412). The spatiotemporal watering control may comprise instructions to operate the sprinkler node to deliver a directed fluid stream. The spatiotemporal watering control may include a specific water pattern to delivery to the deficient region. A directed fluid stream is delivered to one or more of the deficient regions within the watering area through operation of the sprinkler node as controlled by the spatiotemporal watering control (block 414).

In some embodiments, the at least one sensor comprises one or more of an image sensor and a ground sensor to generate imaging data and soil condition readings, respectively, further comprising combining the imaging data and the soil condition readings into combined node data through operation of a combiner, the combined node data mapped to the geolocation map to generate the mapped node data. The mapped node data and spatiotemporal weather information, which may be received from a network may be correlated to generate a current node snapshot through operation of a correlator, the current node snapshot compared with the recorded sprinkler node activity data.

In other embodiments, the at least one sensor is combined with at least one other sprinkler node to form a sprinkler cluster. The at least one sensor of at least one other sprinkler node is operated to collect the node sensor readings of the watering area proximal to the at least one other sprinkler node, and the node sensor readings of the sprinkler node and the at least one other sprinkler node are combined into combined cluster data through operation of a combiner, the combined cluster data mapped to the geolocation map to generate mapped cluster data, the mapped cluster data compared to recorded sprinkler cluster activity data. The selector may select the spatiotemporal watering control for one or more of the sprinkler node and the at least one other sprinkler node. The mapped cluster data and spatiotemporal weather information is correlated to generate a current cluster snapshot through operation of a correlator, the current cluster snapshot compared with the recorded sprinkler cluster activity data. Each of the sprinkler node and the at least one other sprinkler node may communicate directly with a hub to send the node sensor readings and receive the activation control. The sprinkler node and the at least one other sprinkler node of the sprinkler cluster may operate as part of a mesh network communicating with a hub to send the node sensor readings and receive the activation control.

In further embodiments, the geolocation map is generated utilizing the at least one sensor. The spatiotemporal watering control may be utilized to further operate the at least one sensor of the sprinkler node to collect the node sensor readings of the watering area proximal to the sprinkler node. The spatiotemporal watering control may further control the sprinkler node to deliver a directed soil enrichment stream. The recorded sprinkler node activity data may comprise node snap shots, each comprising sprinkler node sensor readings and recorded spatiotemporal weather information, and corresponding activation controls sent to the sprinkler node. The spatiotemporal watering control may control activation time, flow pattern and water volume for the directed fluid stream, and calibration settings for the sprinkler node. A recommendation notification may be generated based on the activation control operating the sprinkler node for a specific deficient region in excess of a pre-determined threshold value, the recommendation notification altering a machine display. The deficient regions may be one or more pests.

Figure 5:
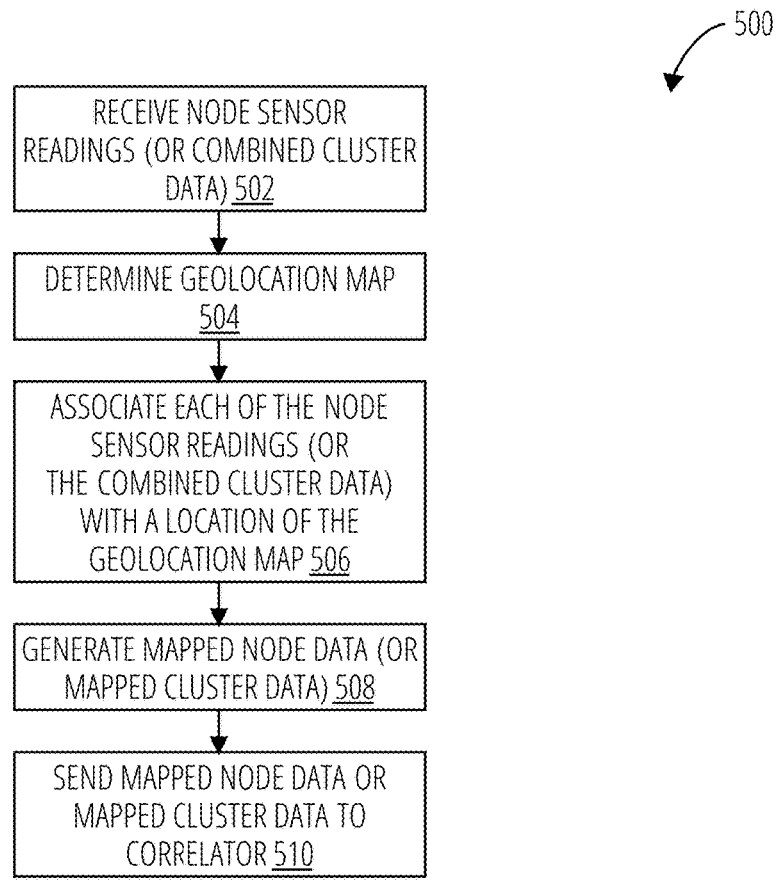
FIG. 5 illustrates an embodiment of an interpretation method 500.

Referring to FIG. 5, an interpretation method 500 receives node sensor readings (or combined cluster data) (block 502). The node sensor readings may be received from a sprinkler node. The combined cluster data may be received from a combiner. In some embodiments, the sprinkler node may receive node sensor readings from more than one sensor. A combiner may then be utilized to combine those node sensor readings into combined node data, which is received by the interpreter. A geolocation map is then determined (block 504). The geolocation map may be a topographic map, satellite imaging map, virtual map, etc. Each of the node sensor readings (or the combined cluster data) is associated with a location of the geolocation map (block 506). The geolocation map may comprise a set of coordinates, which may also be a grid. The node sensor readings (or the mapped cluster data) may comprise location data. For example, an image sensor may determine that a brown spot is centered at 10 degrees from a zero orientation rotation at a particular location within its view, and comprising 10% of the image. As the sensor may be located at a specific coordinates, the coordinates of the brown spot may be mapped to the geolocation map at the corresponding coordinates. The interpreter may account for geographic features, such as surface depressions and rises. The mapped node data (or the mapped cluster data) is generated (block 508). The mapped node data (or the mapped cluster data) is sent to the correlator (block 510).

Figure 6:
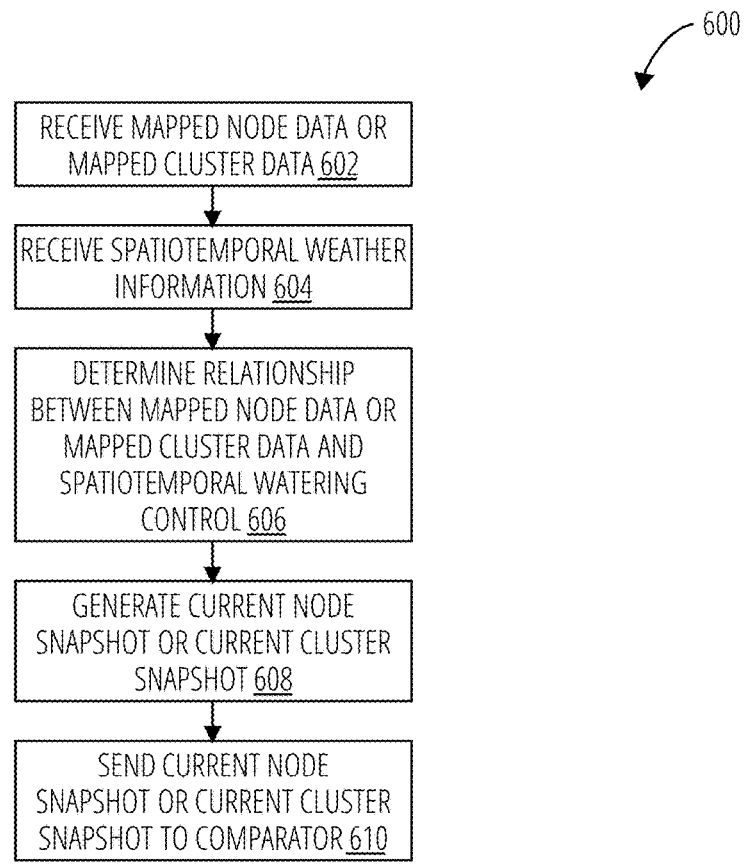
FIG. 6 illustrates an embodiment of a correlation method 600.

Referring to FIG. 6, a correlation method 600 receives mapped node data (or mapped cluster data) (block 602) and spatiotemporal weather information (block 604). The mapped node data or mapped cluster data may be received from an interpreter. The spatiotemporal weather information may be received from a network or determined locally. A relationship between the mapped node data (or the mapped cluster data) and the spatiotemporal weather information. In some embodiments, the correlator may utilize a lookup table to determine the relationship. An exemplary relationship may be a brown spot at a specific grid location of the geolocation map with 0.5 inches of rain predicted within the next hour may be associated, while a predicted sunless hour would not be associated. The correlator may further alter the mapped node data (or the mapped cluster data), such as altering the brown spot above to a green spot. A current node snapshot (or a current cluster snapshot) is then generated (block 608). The current node snapshot (or the current cluster snapshot) may comprise the associated relationship for the mapped node data (or the mapped cluster data) and the spatiotemporal weather information. The current node snapshot (or the current cluster snapshot) is then sent to the comparator (block 610).

Figure 7:
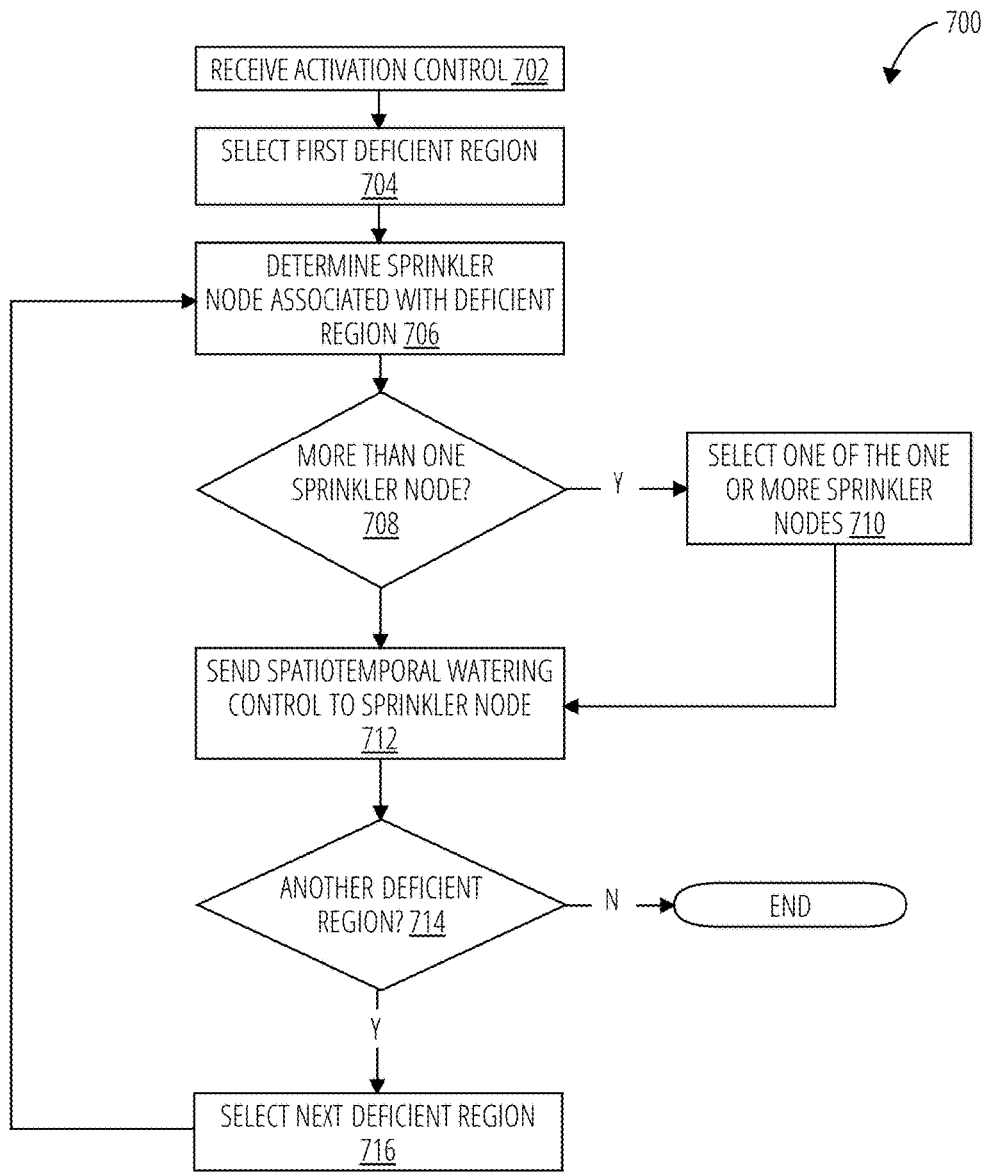
FIG. 7 illustrates an embodiment of a selection method 700.

Referring to FIG. 7, a selection method 700 receives an activation control (block 702). The activation control may be received from a comparator. The first deficient region is then selected (block 704). The sprinkler node associated with the deficient region is determined (block 706). The selection method 700 determines whether more than one sprinkler node is associated with the deficient region (decision block 708). If so, one of the sprinkler nodes is selected (block 710). The sprinkler node may be selected based on the number of deficient regions that have been associated with those sprinkler nodes. The sprinkler node may be selected by the sprinkler node with the least deficient regions, most deficient regions, minimize total number of sprinkler nodes utilized, etc. In some embodiments, the selection method 700 may delay determining the sprinkler node until the other deficient regions are associated with a sprinkler node. The selection method 700 may also select more than one sprinkler node to be associated with the deficient region. The spatiotemporal watering control for a deficient region associated with more than one sprinkler node may differ from a spatiotemporal watering control associated with one sprinkler node. Once a sprinkler node is selected or if only one sprinkler node was associated with the deficient region, a spatiotemporal watering control is sent to the selected sprinkler node (block 712). The spatiotemporal watering control may be combined with other spatiotemporal watering controls for a specific sprinkler node prior to being sent to that sprinkler node. The selection method 700 then determines whether there is another deficient region (decision block 714). If so, the selection method 700 selects the next deficient region (block 716). This process may be performed by an incrementer. The selection method 700 returns to block 706 and repeats the process until each deficient region is assigned to a sprinkler node.

In some embodiments, an activation control may comprise instructions for when to activate a sensor and send the sprinkler node sensor readings to a hub. The selection method 700 may be operated by a neural network.

Figure 8:
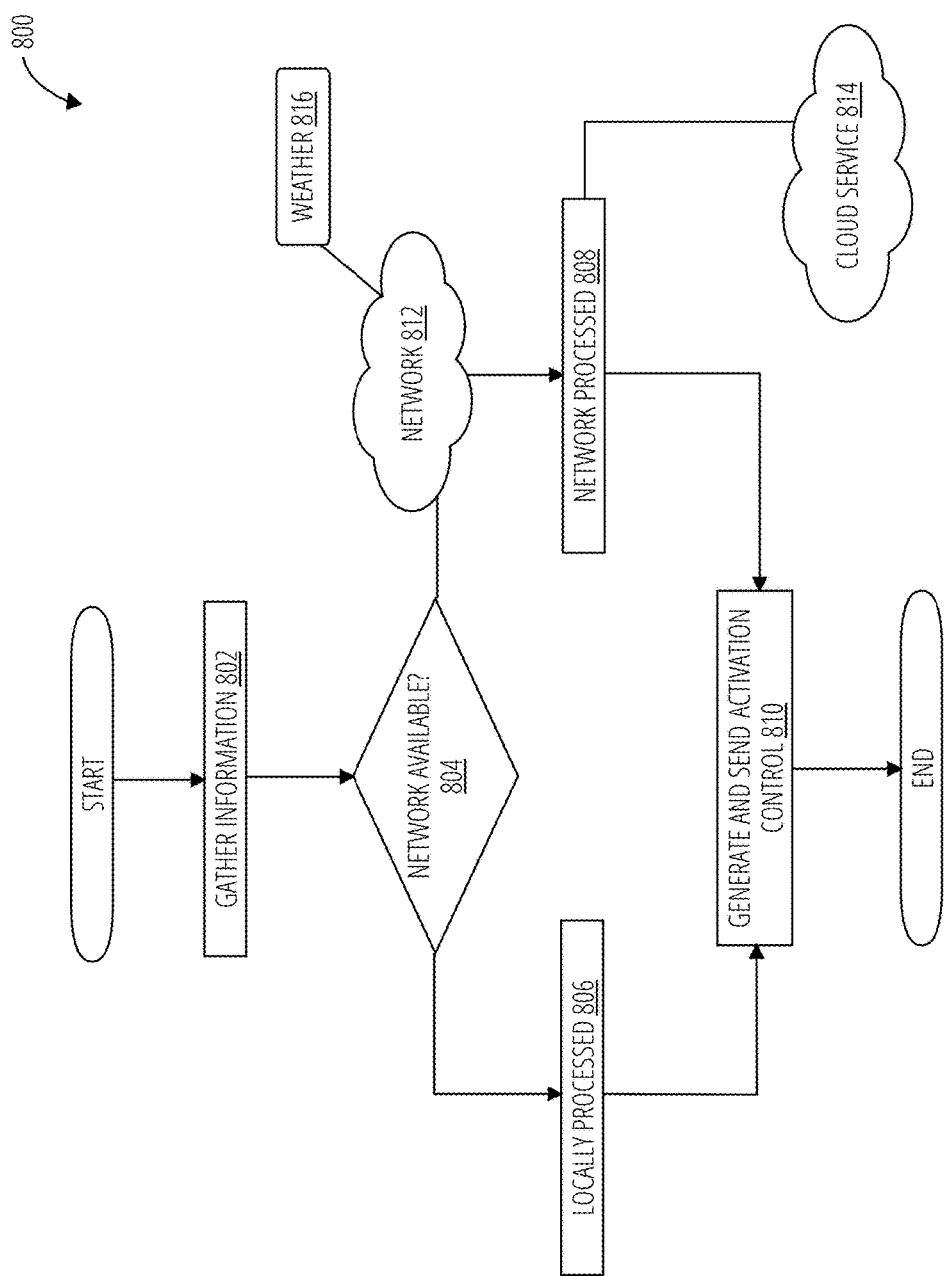
FIG. 8 illustrates an embodiment of logic for selecting processing location for operation of the system for allocating irrigation resources 800.

Referring to FIG. 8, a logic for selecting processing location for operation of the system for allocating irrigation resources 800 gathers information from the sprinkler nodes (block 802). The logic for selecting processing location for operation of the system for allocating irrigation resources 800 determines whether to process the collected information locally or via the cloud service 814 based on the availability of the network 812 (decision block 804). If the network 812 is unavailable, the combined cluster data, recorded sprinkler cluster activity data, and the pre-configured watering parameters is processed locally (block 806). If the network 812 is available, the weather conditions 816 are collected, and the combined cluster data, recorded sprinkler cluster activity data, weather input data, and the pre-configured watering parameters are processed through a cloud service 814 (block 808). An activation control is generated and delivered to the sprinkler cluster (block 810). In some embodiments, the logic for selecting processing location for operation of the system for allocating irrigation resources 800 may be performed by a neural network.

Figure 9:
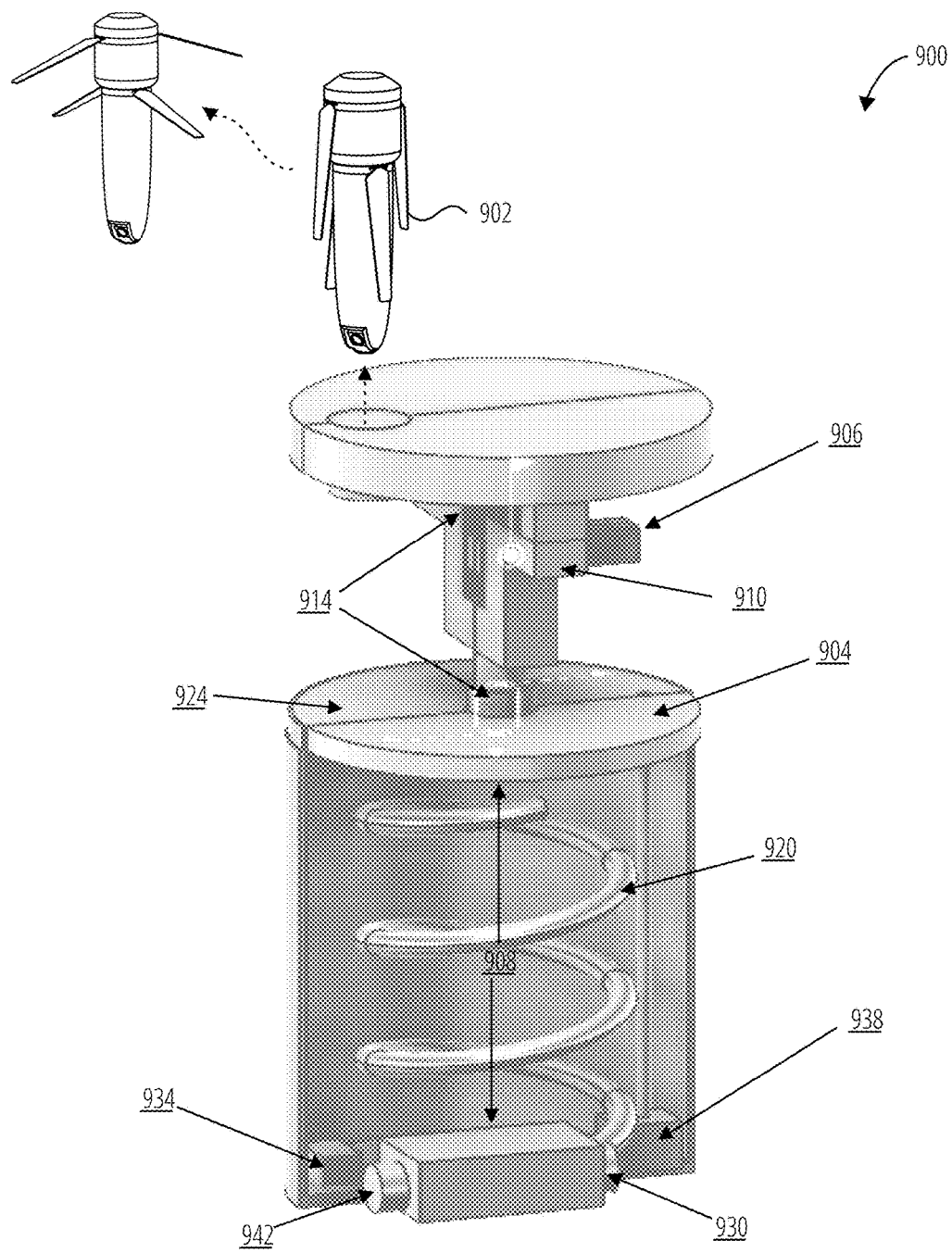
FIG. 9 illustrates an embodiment of a sprinkler head 900.

Referring to FIG. 9, a sprinkler head 900 comprises an optical sensor drone 902, a retractable pan surface 904, a variable water nozzle 906, a pan motor 908, a nozzle tilt motor 910, a water swivel joint 914, a flexible coiled water tube 920, a retractable rotating tower 924, a water solenoid 930, a controller 934, a platform jackscrew motor 938, and a pressure regulator 942.

The optical sensor drone 902 may be stored and release from a storage compartment in the sprinkler head 900 to collect optical imaging data from the surrounding area. The optical sensor drone 902 or other optical sensor may be included to collect sensor and image information from the immediately area surrounding (i.e., proximal to) the sprinkler head. The optical sensor drone 902 may be attached to a tether to provide power and connection to the controller 934. The optical sensor drone 902 may incorporate a simple single motor counter rotating propeller design. The sensor information collected may include, but is not be limited to, physical location and orientation sensors, weather, infrared, and other imaging. In some embodiments, the sprinkler head 900 comprises a retractable image sensor instead of or in addition to the optical sensor drone 902. The image sensor may be stored within the sprinkler head 900 and utilize a telescoping feature to be positioned to receive images. The retractable image sensor may have motor to telescope, retract, and rotate. The imaging data may be sent to a hub or the controller 934, which may then send the imaging data to the hub or process the imaging data locally. The optical sensor drone 902 other optical sensor may be utilized to determine a virtual geolocation map.

The retractable pan surface 904 is raised and lowered through the operation of the platform jackscrew motor 938. The retractable pan surface 904 may also be raised and lower by the flow of a fluid stream through a piston. The retractable pan surface 904 may have an orifice(s) for the optical sensor drone 902 or other sensor.

The variable water nozzle 906 alters a fluid stream into a directed fluid stream. The variable water nozzle 906 has a 360 degrees axial rotation and lateral tilt in at least one direction. The variable water nozzle 906 may be able to vary its motion to change water patterns and duration to vary the amount of water to areas within its range through the operation of the pan motor 908 and the nozzle tilt motor 910. The variable water nozzle 906 may retract into the body using the platform jackscrew motor 938 and jackscrew. A piston mechanism may also be utilized. The variable water nozzle 906 may also alter the water pressure and head patterns. The variable water nozzle 906 may comprise multiple nozzles, where the active nozzle selected by the controller 934. The active nozzle is associated with an operating mode, which may deliver the directed fluid stream in a different manner.

The pan motor 908 alters the orientation of the variable water nozzle 906 and the retractable rotating tower 924. The pan motor 908 receives control signals from the controller 934 to orient the variable water nozzle 906 and the retractable rotating tower 924.

The nozzle tilt motor 910 alters the angle of the variable water nozzle 906, which may adjust the location of the directed fluid stream. The nozzle tilt motor 910 receives control signals from the controller 934 to alter the variable water nozzle 906.

The water swivel joint 914 is couples the retractable rotating tower 924 and the variable water nozzle 906. As the pan motor 908 rotates the retractable rotating tower 924, the variable water nozzle 906 is then re-oriented via the water swivel joint 914.

The flexible coiled water tube 920 carries a fluid stream to the variable water nozzle 906 from a fluid source. The fluid stream is regulated by the pressure regulator 942 and the water solenoid 930 by control signals from the controller 934.

The retractable rotating tower 924 is coupled to the variable water nozzle 906 by the water swivel joint 914. The retractable rotating tower 924 is rotated by the pan motor 908.

The water solenoid 930 receives control signals from the controller 934 to regulate the flow of the fluid stream. The water solenoid 930 may have a closed position to inhibit the fluid stream from entering the flexible coiled water tube 920.

The controller 934 determines the operations of the optical sensor drone 902, the pan motor 908, the nozzle tilt motor 910, the water solenoid 930, the platform jackscrew motor 938, and the pressure regulator 942. By varying the operation of these components, the controller 934 alters the position and orientation of the variable water nozzle 906 and the pressure of the fluid stream to send the directed fluid stream to a deficient region. The controller 934 may store patterns for specific deficient regions. The patterns are sequences of operations to apply a directed fluid stream to a deficient region. The controller 934 may also control the operation of one or more soil enrichment devices. The controller 934 may receive a spatiotemporal watering control to operate. The controller 934 may utilize the optical sensor drone 902 or other imaging sensor to determine whether the deficient region is appropriately targeted. The controller 934 may further receive signals from a compass, a gyroscope, or a hull effect sensor to determine the orientation of the sprinkler head 900. The hull effect sensor may be a pair of sensors, one place on a non-rotating portion of the sprinkler head 900 and another place on a rotation portion or the sprinkler head 900, such as the retractable rotating tower 924. The hull effect sensor may then determine the difference in orientation of one sensor to the other. The difference may be correlated to imaging data. The compass and the gyroscope may also be correlated to the imaging data. The sprinkler head 900 further may operate the optical sensor drone 902 or other sensor to operate to receive node sensor readings. The node sensor readings may be sent to a hub for processing or processed locally by the controller 934, which may operate as a local hub.

The platform jackscrew motor 938 operates to raise and lower the retractable pan surface 904 and, thus raises and lowers the retractable rotating tower 924 and the variable water nozzle 906. The platform jackscrew motor 938 may receive a control signal from the controller 934 to raise or lower.

The pressure regulator 942 operates to alter the pressure of the fluid stream. The pressure regulator 942 may receive a control signal from the controller 934 to alter the pressure of the fluid stream.

In some embodiments, the sprinkler head 900 may comprise a retractable piston. The retractable piston may replace the platform jackscrew motor 938 and the jackscrew. The retractable piston may under fluid pressure raise or lower and, thus, raise or lower the retractable pan surface 904, the retractable rotating tower 924, and the variable water nozzle 906. The retractable piston may be attached to the retractable pan surface 904. The retractable piston may have a motor to raise or lower as well, the motor receiving a control signal from the controller 934 to operate. The water solenoid 930 may also be utilized to vacuum the fluid stream to alter the retractable piston.

The sprinkler head 900 may comprise soil enrichment devices. The device may be cartridges that inject soil enriching material into the fluid stream. The cartridges may be located in the body of the sprinkler head 900 and inject into the flexible coiled water tube 920, the retractable piston, or some other location. The soil enrichment devices may be operated by the controller 934 to alter the directed fluid stream into a directed soil enrichment stream; the controller 934 receiving a spatiotemporal watering control to operate the soil enrichment devices.

The controller 934 may operate with the optical sensor drone 902 or other image sensor, the pressure regulator 942, the nozzle tilt motor 910, and the pan motor 908 to perform a pressure calibration (or calibration cycle). The nozzle tilt motor 910 and the pan motor 908 orient the variable water nozzle 906 and the pressure regulator 942 alters the fluid pressure of the fluid stream. A pressure sensor determines the fluid pressure and the controller 934 associates the imaging data from the image sensor with the fluid pressure.

A calibration cycle may comprise utilizing the image sensor to determine calibration regions, altering the operations of the sprinkler head to adjust the directed fluid stream to each of the calibration regions, utilizing the image sensor to determine whether the directed fluid stream is applied to the calibration regions, and determining calibration settings based on the operations of the sprinkler head to apply the directed fluid stream to each of the calibration regions. This process may be repeated for various orientations of the variable water nozzle 906.

Figure 10:
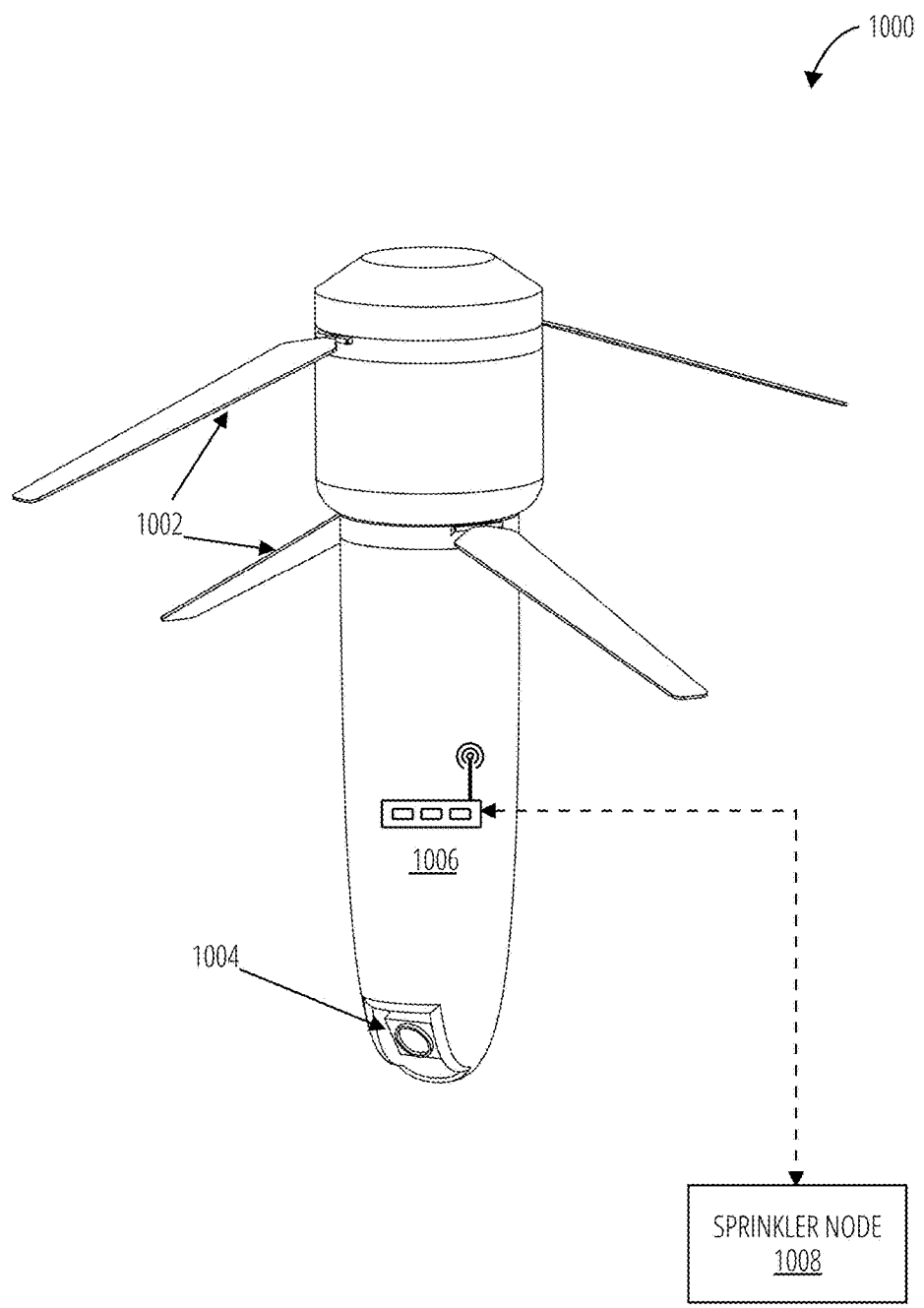
FIG. 10 illustrates an embodiment of an optical sensor drone 1000.

Referring to FIG. 10, the optical sensor drone 1000 comprises retractable propellers 1002, an optical sensor 1004, and a transceiver 1006. The transceiver 1006 may communicate imaging data collected through the optical sensor 1004 to the sprinkler node 1008. The sprinkler node 1008 may communicate control information to the optical sensor drone 1000. The retractable propellers 1002 may be incorporated for facilitated storage of the optical sensor drone 1000 in the sprinkler node 1008. The optical sensor drone 1000 may be deployed in accordance with a pre-configured schedule for collecting imaging data, a user-specified collection request, or in response to environmental factors. The pre-configured schedule for collecting imaging data may be modified or delayed based on environmental factors (e.g. weather, visibility, etc.) that could impede collection of the optical imaging data and the retrieval of the optical sensor drone 1000. The optical sensor drone 1000 may autonomously return to the sprinkler node 1008 for docking and storage following collection of the optical imaging data. Alternatively, the optical sensor drone 1000 may travel to a predefined location to facilitate recovery and retrieval by a user.

Figure 11:
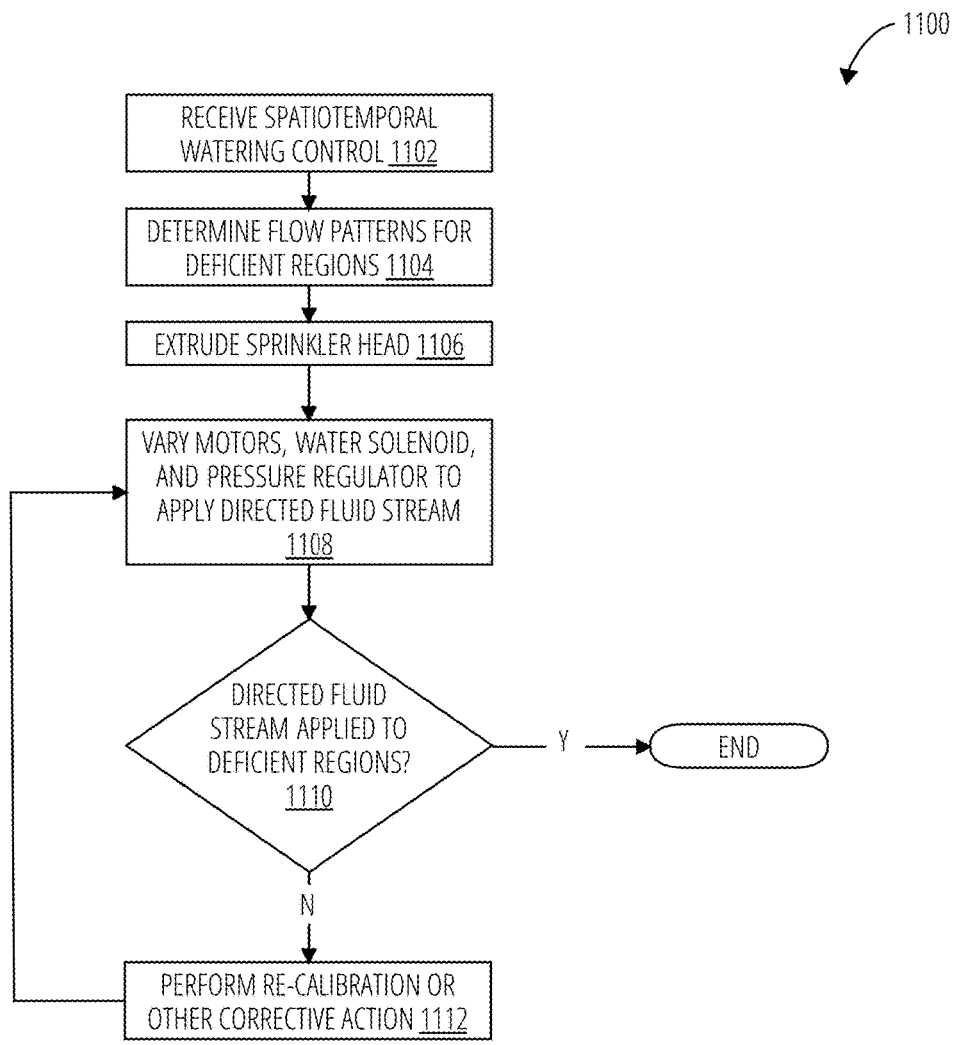
FIG. 11 illustrates an embodiment of a sprinkler node operation method 1100.

Referring to FIG. 11, a sprinkler node operation method 1100 receives a spatiotemporal watering control (block 1102). The spatiotemporal watering control may be received from a hub or may be generated by a controller acting as a local hub. The flow patterns for the deficient regions defined by the spatiotemporal watering control are determined (block 1104). The flow patterns may be utilized to minimize the fluid or energy to provide a directed fluid stream to each deficient region. The sprinkler head is extruded (block 1106). A motor and jackscrew, or a retractable piston under water pressure may be utilize to extrude the sprinkler head. The motors, the water solenoid, and the pressure regulator are varied to apply the directed fluid stream to the deficient regions (block 1108). The motors may orient the variable water nozzle, and the pressure regulator may be utilized to alter the distance of the directed fluid stream based on pressure calibration settings. The water solenoid may be utilized to cease the directed fluid stream while the variable water nozzle is being oriented from a non-deficient region to a deficient region. The sprinkler node operation method 1100 determine whether the directed fluid stream is being applied to the appropriate deficient regions (decision block 1110). An image sensor may be utilized with a rotation sensor (e.g., a hull sensor, a gyroscope, or a compass) to determine whether the directed fluid stream is being applied to the deficient regions. If not re-calibration or another corrective action is performed (block 1112). Once the corrective action is performed, the sprinkler node operation method 1100 performs the block 1108 and the decision block 1110 until the directed fluid stream is applied to the deficient regions. The sprinkler node operation method 1100 then ends. In some embodiments, the sprinkler node operation method 1100 may also determine whether to alter the directed fluid stream to a directed soil enrichment stream to deliver selected nutrients to the deficient region or regions. The sprinkler node operation method 1100 may be operated by a neural network.

Figure 12:
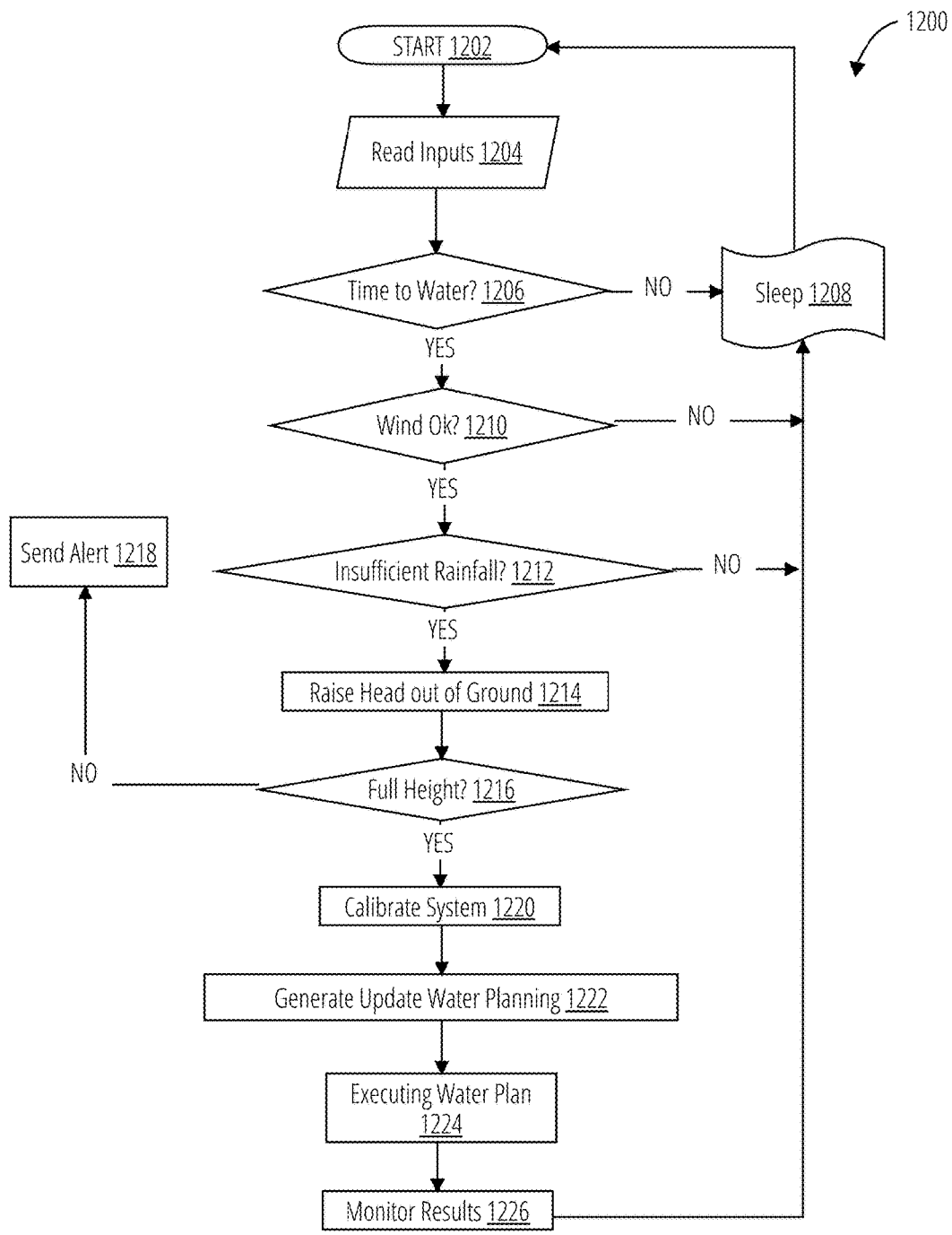
FIG. 12 illustrates an embodiment of a logic for operating a system for allocating irrigation resources 1200.

Referring to FIG. 12, a logic for operating a system for allocating irrigation resources 1200 is activated from a dormant state (e.g., sleep) upon receiving input start (start block 1202). The logic for operating a system for allocating irrigation resources 1200 reads inputs comprising the combined cluster data and spatiotemporal weather information in (block 1204). The logic for operating a system for allocating irrigation resources 1200 evaluates the current cluster snapshot, historical cluster activity, and the pre-configured watering parameters to determine if it is time to water (decision block 1206). If the logic for operating a system for allocating irrigation resources 1200 determines it is not time to water, the logic for operating a system for allocating irrigation resources 1200 returns to its dormant state awaiting additional inputs (sleep 1208). Else, the logic for operating a system for allocating irrigation resources 1200 proceeds to determine if wind will affect water delivery (decision block 1210). If the logic for operating a system for allocating irrigation resources 1200 determines that wind will affect water delivery, the logic for operating a system for allocating irrigation resources 1200 returns to its dormant state awaiting additional inputs (sleep 1208). Else, the logic for operating a system for allocating irrigation resources 1200 proceeds to determine if there has been insufficient rainfall (decision block 1212). If the logic for operating a system for allocating irrigation resources 1200 determines there has not been insufficient rainfall, the logic for operating a system for allocating irrigation resources 1200 returns to its dormant state awaiting additional inputs (sleep 1208). Else, the logic for operating a system for allocating irrigation resources 1200 transmits the activation control and proceeds to raise the sprinkler head out of the ground (block 1214). The logic for operating a system for allocating irrigation resources 1200 determines if the sprinkler head is fully extended from its inactive storage state (decision block 1216). If the logic for operating a system for allocating irrigation resources 1200 determines that the sprinkler head is not fully extended, the logic for operating a system for allocating irrigation resources 1200 sends an alert notifying of the malfunction (block 1218). Else, the logic for operating a system for allocating irrigation resources 1200 proceeds to calibrate the sprinkler head in (block 1220). The logic for operating a system for allocating irrigation resources 1200 generates an updated water plan following system calibration (block 1222). The logic for operating a system for allocating irrigation resources 1200 executes the watering plan (block 1224). The logic for operating a system for allocating irrigation resources 1200 monitors the results of the water plan (block 1226) and returns to its dormant state awaiting additional inputs (sleep 1208).

Figure 13:
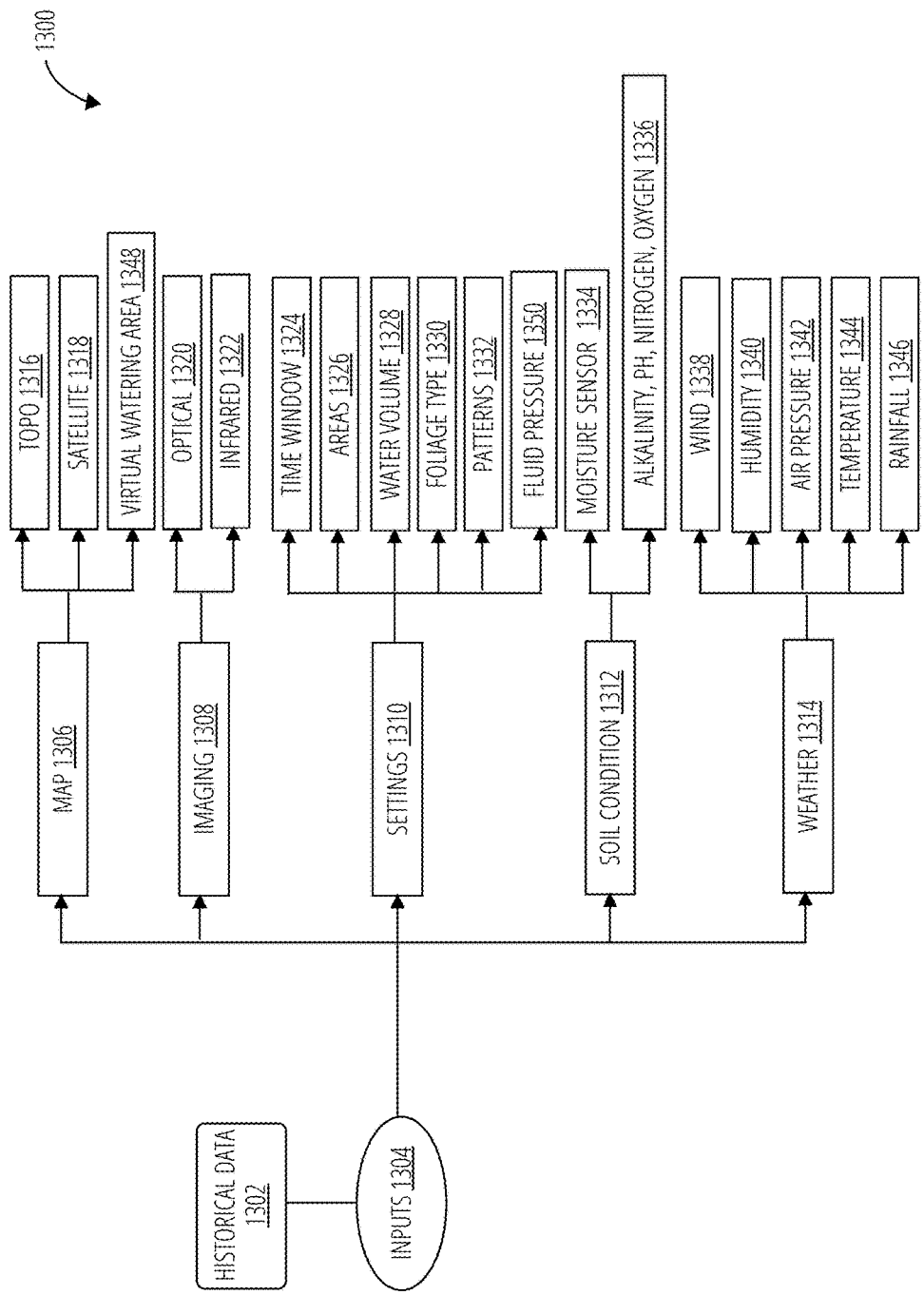
FIG. 13 illustrates an embodiment of input data organization 1300 utilized by the system for allocating irrigation resources.

Referring to FIG. 13, an input data organization 1300 utilized by the system for allocating irrigation resources comprises a historical data 1302 and inputs 1304. The inputs 1304 comprise map input data 1306, imaging input data 1308, settings data 1310, soil condition data 1312, and weather input data 1314. The map input data 1306 comprises topographical data 1316, satellite mapping data 1318, and a virtual watering area 1348. The imaging input data 1308 comprises optical imaging data 1320 and infrared imaging data 1322. The settings data 1310 comprises time window setting 1324, area of operation data 1326, water volume data 1328, fauna and foliage data 1330, delivery pattern data 1332, and fluid pressure data 1350. The soil condition data 1312 comprises soil moisture at least one sensor data 1334 and alkalinity, pH, nitrogen, and oxygen content data 1336. The weather input data 1314 comprises wind data 1338, humidity data 1340, air pressure data 1342, temperature data 1344, and rainfall data 1346. A sensor may be utilized to determine the map input data 1306, the imaging input data 1308, the soil condition data 1312, and the weather input data 1314. The map input data 1306 may also be received from a network or stored in a hub. The weather input data 1314 may also be received from a network. The settings data 1310 may be stored in a control memory data structure and retrieved during operation.

Figure 14:
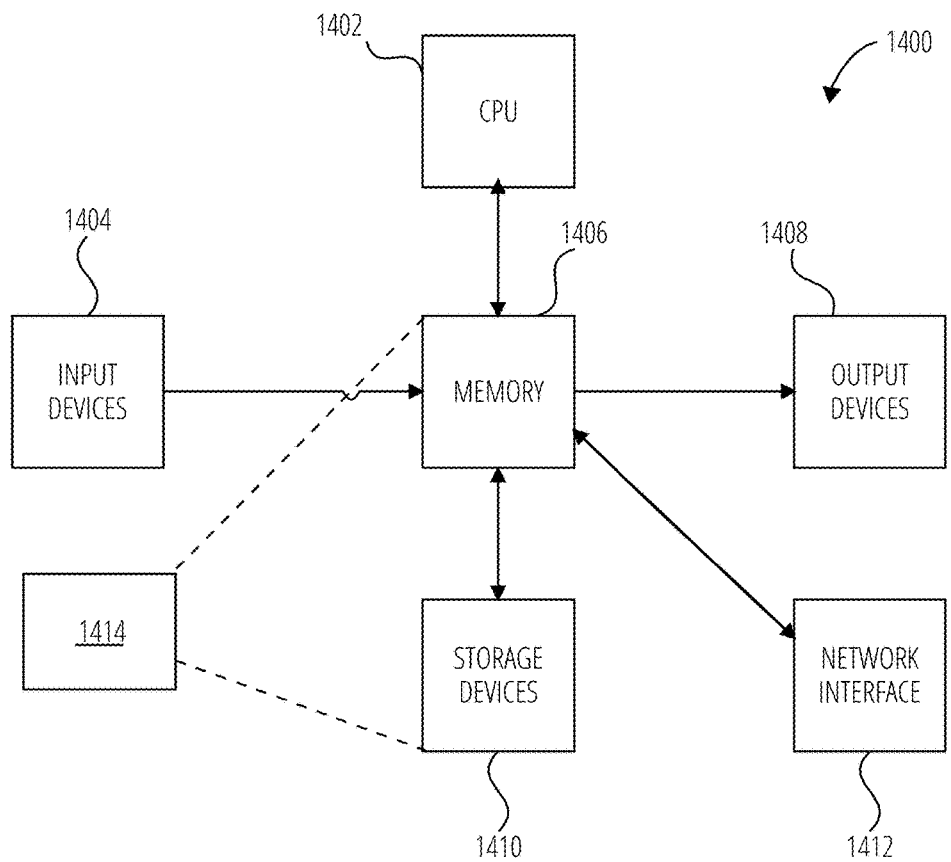
FIG. 14 illustrates an embodiment of a digital apparatus 1400 to implement components and process steps of the system described herein.

FIG. 14 illustrates an embodiment of a digital apparatus 1400 to implement components and process steps of the system described herein.

Input devices 1404 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1404 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1404 are provided via various machine signal conductors (e.g., busses or network interfaces) and circuits to memory 1406.

The memory 1406 is typically what is known as a first or second level memory device, providing for storage (via configuration of matter or states of matter) of signals received from the input devices 1404, instructions and information for controlling operation of the CPU 1402, and signals from storage devices 1410.

The memory 1406 and/or the storage devices 1410 may store computer-executable instructions and thus forming logic 1414 that when applied to and executed by the CPU 1402 implement embodiments of the processes disclosed herein.

Information stored in the memory 1406 is typically directly accessible to the CPU 1402 of the device. Signals input to the device cause the reconfiguration of the internal material/energy state of the memory 1406, creating in essence a new machine configuration, influencing the behavior of the digital apparatus 1400 by affecting the behavior of the CPU 1402 with control signals (instructions) and data provided in conjunction with the control signals.

Second or third level storage devices 1410 may provide a slower but higher capacity machine memory capability. Examples of storage devices 1410 are hard disks, optical disks, large capacity flash memories or other non-volatile memory technologies, and magnetic memories.

The CPU 1402 may cause the configuration of the memory 1406 to be altered by signals in storage devices 1410. In other words, the CPU 1402 may cause data and instructions to be read from storage devices 1410 in the memory 1406 from which may then influence the operations of CPU 1402 as instructions and data signals, and from which it may also be provided to the output devices 1408. The CPU 1402 may alter the content of the memory 1406 by signaling to a machine interface of memory 1406 to alter the internal configuration, and then converted signals to the storage devices 1410 to alter its material internal configuration. In other words, data and instructions may be backed up from memory 1406, which is often volatile, to storage devices 1410, which are often non-volatile. The storage devices 1410 may comprise logic 1414 for operating the process for operating a system for allocating irrigation resources 300, logic for selecting processing location for operation of the system for allocating irrigation resources 800, and logic for operating a system for allocating irrigation resources 1200.

Output devices 1408 are transducers which convert signals received from the memory 1406 into physical phenomenon such as vibrations in the air, or patterns of light on a machine display, or vibrations (i.e., haptic devices) or patterns of ink or other materials (i.e., printers and 3-D printers).

The network interface 1412 receives signals from the memory 1406 and converts them into electrical, optical, or wireless signals to other machines, typically via a machine network. The network interface 1412 also receives signals from the machine network and converts them into electrical, optical, or wireless signals to the memory 1406.

Figure 15:
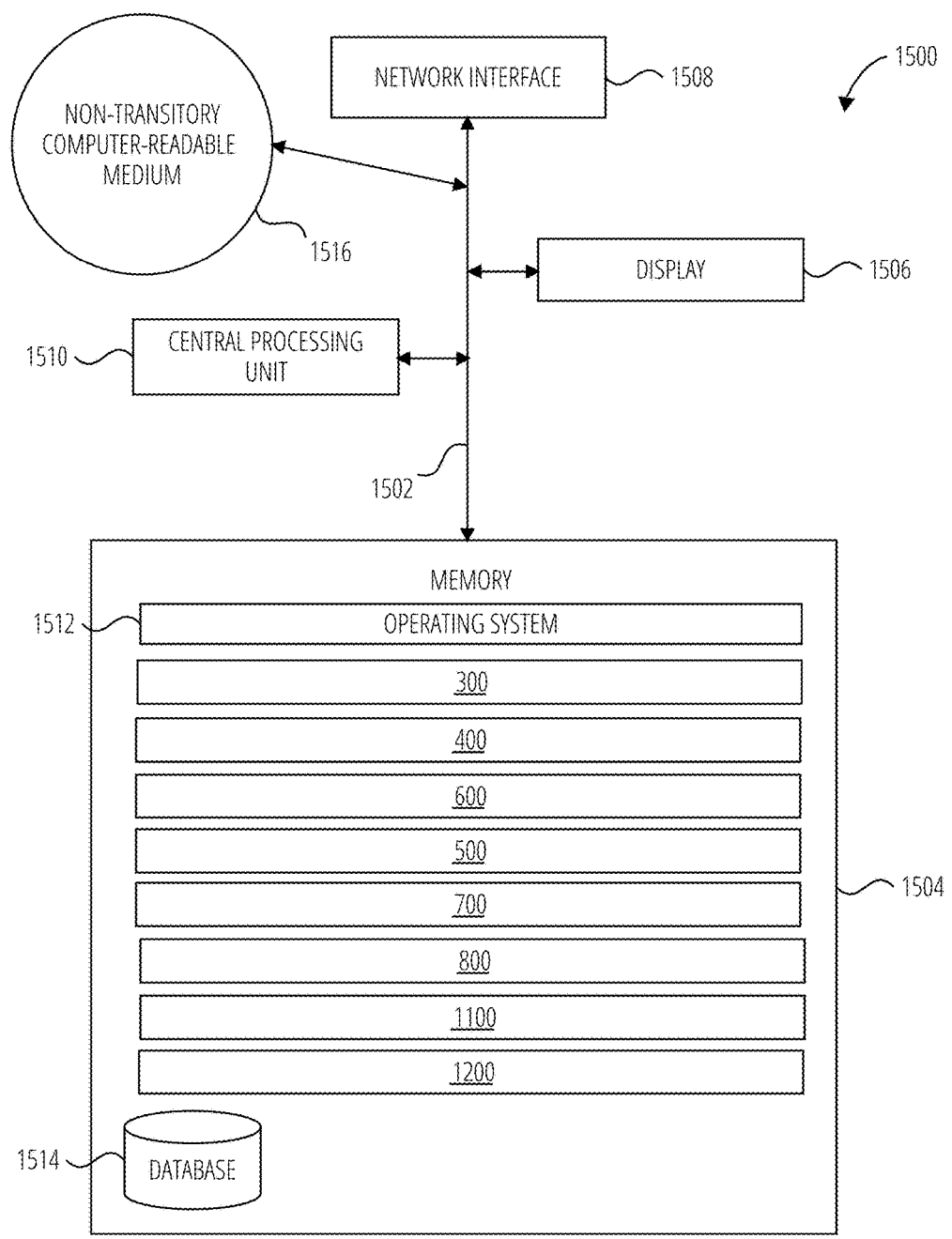
FIG. 15 illustrates a system 1500 in accordance with one embodiment.

FIG. 15 illustrates several components of an exemplary system 1500 in accordance with one embodiment. In various embodiments, system 1500 may include a desktop PC, server, workstation, mobile phone, laptop, tablet, set-top box, appliance, or other computing device that is capable of performing operations such as those described herein. In some embodiments, system 1500 may include many more components than those shown in FIG. 15. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1500 may comprise one or more physical and/or logical devices that collectively provide the functionalities described herein. In some embodiments, system 1500 may comprise one or more replicated and/or distributed physical or logical devices.

In some embodiments, system 1500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1500 includes a bus 1502 interconnecting several components including a network interface 1508, a display 1506, a central processing unit 1510, and a memory 1504.

Memory 1504 generally comprises a random access memory ("RAM") and permanent non-transitory mass storage device, such as a hard disk drive or solid-state drive. Memory 1504 stores an operating system 1512.

These and other software components may be loaded into memory 1504 of system 1500 using a drive mechanism (not shown) associated with a non-transitory computer-readable medium 1516, such as a DVD/CD-ROM drive, memory card, network download, or the like.

Memory 1504 also includes database 1514. In some embodiments, system 1500 may communicate with database 1514 via network interface 1508, a storage area network ("SAN"), a high-speed serial bus, and/or via the other suitable communication technology.

In some embodiments, database 1514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Clock" in this context refers to a circuit that generates a periodic signal, with a rate typically measured in cycles per second (measured in hertz, kilohertz, megahertz or gigahertz), to drive the operation of a synchronous circuit. A typical digital clock cycle toggles between a logical zero and a logical one state.

"Combiner" in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Control (or control signal)" in this context refers to a pulse or frequency of electricity or light that represents a control command as it travels over a network, a computer channel or wireless.

"Controller" in this context refers to logic, collection of logic, or circuit that coordinates and controls the operation of one or more input/output devices and synchronizes the operation of such devices with the operation of the system as a whole. For example, the controller may operate as a component or a set of virtual storage processes that schedules or manages shared resources. For example, IF (controller.logic {device1|device2|device3} {get.data( ), process-.data( ),store.data( )}), -device1 get.data(input1)→data.input1; -device2 process.data(data.input1)→formatted.data1→-device3 store.data(formatted.data1).

"Correlator" in this context refers to a logic element that identifies a configured association between its inputs. One examples of a correlator is a lookup table (LUT) configured in software or firmware. Correlators may be implemented as relational databases. An example LUT correlator is: |low_alarm_condition |low_threshold_value|0| |safe_condition |safe_lower_bound |safe_upper_bound| |high_alarm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Deficient regions" in this context refers to geographic locations within a watering area determined to receive a directed fluid stream.

"Geolocation map" in this context refers to a set of geographic coordinates for the identification or estimation of a geographic location of an object, such as a radar source, mobile phone, or Internet-connected computer terminal.

"Hub" in this context refers to one or more logic modules and control memory structures to alter a set of inputs to a control signal.

"Incrementer" in this context refers to logic to advance (increase or decrease) a counting or index value by a fixed or predictably variable amount. Examples of hardware incrementers include adder arithmetic circuits and counter circuits. An example of a software incrementer is: x=x+ incrementValue. Incrementers may be used as counters, or as logic to advance a referencial or associative index in a memory data structure.

"Mesh network" in this context refers to a local network topology in which the infrastructure nodes (i.e. bridges, switches and other infrastructure devices) connect directly, dynamically and non-hierarchically to as many other nodes as possible and cooperate with one another to efficiently route data from/to clients.

"Network" in this context refers to a telecommunications network which allows nodes to share resources. In computer networks, networked computing devices exchange data with each other using a data link. The connections between nodes are established using either cable media or wireless media.

"Neural network" in this context refers to an interconnected group of nodes utilizing a series of algorithms that identify underlying relationships in a set of data by adapting to changing input so the network produces a result without the need to redesign the output criteria.

"Parser" in this context refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x; y_pos=gpsCoordinate.y; z_pos=gpsCoordinate.z; Other examples of parsers will be readily apparent to those of skill in the art, without undo experimentation.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Sensor" in this context refers to a device that detects or measures a physical property and records, indicates, or otherwise responds to it.

"Sequencer" in this context refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

"Signal" in this context refers to one or more energy impulses that convey control commands, data, or attributes between machine elements or between people, or a combination of machines and people. Any physical entity exhibiting variation in time or variation in space is potentially a signal. Examples of signals include electrical impulses such as analog or binary electrical phenomenon, audio, video, speech, image, communication, geophysical, sonar, radar, and musical signals.

"Sprinkler cluster" in this context refers to one or more associated sprinkler nodes.

"Sprinkler node" in this context refers to a sprinkler head and one or more sensors associated with the sprinkler head.

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection2==true) output=input1; else if (selection1==true and selection2==false) output=input2; else if (selection1==false and selection2==true) output=input3; else output=noOp; Switches operate similarly to selectors in many ways (see the definition of Selector), except in some cases switches may select all inputs to the output,(s) not select among inputs. Other examples of switches will be readily apparent to those having skill in the art, without undo experimentation.

"Watering area" in this context refers to a geographic area associated with the operation capabilities of a sprinkler node.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A system for allocating irrigation resources comprising:
 a plurality of sprinkler nodes, each sprinkler node comprising:
  a sprinkler head to:
   receive a fluid stream; and
   orient a variable water nozzle to send a directed fluid stream to a deficient region within a watering area of the sprinkler node, the variable water nozzle oriented by operation of a pan motor and a tilt motor, a flow pressure of the directed fluid stream altered by operation of a pressure regulator to affect a delivery distance;
  a sensor to:
   generate a sprinkler node sensor reading; and
   send the sprinkler node sensor reading to a hub to transform the sprinkler node sensor reading into a spatiotemporal watering control; and
  a controller to:
   receive the spatiotemporal watering control from the hub; and
   control the sprinkler head based on the spatiotemporal watering control, the spatiotemporal watering control operating the pan motor, the tilt motor, and the pressure regulator to adjust a spray pattern of the sprinkler head to apply the directed fluid stream to specifically favor the deficient region of the watering area, the deficient region being a portion of the watering area;
 the hub to:
  receive the sprinkler node sensor reading from each of the sprinkler nodes;
  map the sprinkler node sensor readings to a geolocation map to generate mapped node readings;
  compare the mapped node readings with recorded sprinkler node activity stored in a control memory data structure to identify deficient regions within the watering area of each of the sprinkler nodes;
  generate the spatiotemporal watering control for each of the sprinkler nodes;
 the hub further to:
  form a plurality of sprinkler clusters each comprising two or more of the sprinkler nodes, each of the sprinkler clusters having a cluster watering area with one or more of the deficient regions located within the cluster watering area, at least one of the deficient regions within the watering area of two or more of the two or more sprinkler nodes in each of the sprinkler clusters; and
  combine the sprinkler node sensor readings from each of the sprinkler clusters into combined cluster readings mapped to the geolocation map to generate mapped cluster readings, and to compare the mapped cluster readings to recorded sprinkler cluster activity to generate the spatiotemporal watering control for each of the sprinkler nodes, the spatiotemporal watering control selecting one of the sprinkler nodes in the sprinkler clusters to apply the directed fluid stream to specifically favor each of the deficient regions in the cluster watering area.

2. The system of claim 1, the sensor comprising an image sensor and a ground sensor to generate imaging data and soil condition readings, respectively, the sprinkler node sensor reading comprising combined node readings comprising the imaging data and the soil condition readings, the hub mapping the combined node readings to the geolocation map to generate the mapped node readings.

3. The system of claim 1, the hub to correlate the mapped node readings with spatiotemporal weather information to generate a current node snapshot, the current node snapshot compared with the recorded sprinkler node activity.

4. The system of claim 1 the hub to correlate the mapped cluster readings and spatiotemporal weather information to generate a current cluster snapshot and to compare the current cluster snapshot with the recorded sprinkler cluster activity to generate the spatiotemporal watering control for each of the sprinkler nodes.

5. The system of claim 1, wherein each of the sprinkler nodes communicates directly with the hub to send the sprinkler node sensor reading and to receive the spatiotemporal watering control.

6. The system of claim 1 wherein the sprinkler nodes operate as a mesh network communicating with the hub to send the sprinkler node sensor readings and to receive the spatiotemporal watering control.

7. The system of claim 1, wherein the spatiotemporal watering control further directs the sensor of the sprinkler node to collect the sprinkler node sensor readings of the watering area proximal to the sprinkler node.

8. The system of claim 1, wherein the spatiotemporal watering control further controls the sprinkler node to deliver a directed soil enrichment stream.

9. The system of claim 1, wherein the recorded sprinkler node activity comprises node snap shots, each of the node snap shots comprising one or more of the sprinkler node sensor readings, recorded spatiotemporal weather information, and the spatiotemporal watering control applied to the sprinkler node.

10. The system of claim 1, wherein the spatiotemporal watering control determines an activation time, a flow pattern, and a water volume for the directed fluid stream, and calibration settings for the sprinkler node.

11. The system of claim 1, the hub to generate a recommendation notification based on the spatiotemporal watering control operating the sprinkler node for a specific deficient region in excess of a pre-determined threshold value.

* * * * *